(12) United States Patent
Hyun

(10) Patent No.: US 9,581,700 B2
(45) Date of Patent: Feb. 28, 2017

(54) METHOD AND APPARATUS TRACKING GLOBAL NAVIGATION SATELLITE SYSTEM (GNSS)

(71) Applicant: SAMSUNG ELECTRONICS CO., LTD., Suwon-si, Gyeonggi-do (KR)

(72) Inventor: Sung-Hwan Hyun, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 757 days.

(21) Appl. No.: 14/027,399

(22) Filed: Sep. 16, 2013

(65) Prior Publication Data

US 2014/0232597 A1    Aug. 21, 2014

(30) Foreign Application Priority Data

Dec. 12, 2012 (KR) .................. 10-2012-0144801

(51) Int. Cl.
    *G01S 19/30* (2010.01)
(52) U.S. Cl.
    CPC .................... *G01S 19/30* (2013.01)
(58) Field of Classification Search
    CPC ........... G01S 19/30; G01S 19/35; G01S 19/37
    USPC .................. 342/357.69, 357.75, 357.77
    See application file for complete search history.

(56) References Cited

U.S. PATENT DOCUMENTS

| | | |
|---|---|---|
| 5,347,536 A | 9/1994 | Meehan |
| 5,692,008 A | 11/1997 | Van Nee |
| 5,809,064 A | 9/1998 | Fenton et al. |
| 5,883,595 A | 3/1999 | Colley |
| 5,901,183 A | 5/1999 | Garin et al. |
| 5,953,367 A | 9/1999 | Zhodzicshsky et al. |
| 5,963,601 A | 10/1999 | Pon et al. |
| 6,047,017 A | 4/2000 | Cahn et al. |
| 6,084,927 A | 7/2000 | Pon |
| 6,198,765 B1 | 3/2001 | Cahn et al. |
| 6,249,542 B1 | 6/2001 | Kohli et al. |
| 6,252,863 B1 | 6/2001 | Raby et al. |
| 6,272,189 B1 | 8/2001 | Garin et al. |
| 6,463,091 B1 | 10/2002 | Zhodzicshsky et al. |

(Continued)

FOREIGN PATENT DOCUMENTS

| | | |
|---|---|---|
| CN | 102183770 A | 9/2011 |
| JP | 2001-281318 | 10/2001 |

(Continued)

OTHER PUBLICATIONS

Shen et al, "A Novel Method of Multipath Mitigation for PN Code Tracking Loop Based on Wavelet Transform," Journal of Astronautics, vol. 33, No. 11, Nov. 2012.

(Continued)

*Primary Examiner* — Harry Liu
(74) *Attorney, Agent, or Firm* — Volentine & Whitt, PLLC

(57) ABSTRACT

Provided are a method and apparatus tracking a global navigation satellite system signal. The method includes generating respective replica codes including an E code, P code, L code, first code and second code, calculating correlation values for a received satellite signal and the replica codes, discriminating between gradients of a plurality of slopes derived from correlation points respectively corresponding to the replica codes, and detecting a time delay due to multipath signal components according to a discrimination result.

28 Claims, 12 Drawing Sheets

(56) References Cited

U.S. PATENT DOCUMENTS

| | | |
|---|---|---|
| 6,658,048 B1 | 12/2003 | Valio |
| 6,792,035 B2 | 9/2004 | Kontola |
| 6,900,758 B1 | 5/2005 | Mann et al. |
| 6,917,644 B2 | 7/2005 | Cahn et al. |
| 7,006,556 B2 | 2/2006 | Abraham et al. |
| 7,085,309 B2 | 8/2006 | Oesch et al. |
| 7,095,813 B2 | 8/2006 | Amerga et al. |
| 7,142,589 B2 | 11/2006 | Valio |
| 7,298,324 B2 | 11/2007 | Manz |
| 7,301,992 B2 | 11/2007 | Kohli et al. |
| 7,440,493 B2 | 10/2008 | Pietila et al. |
| 7,657,230 B2 | 2/2010 | Rowitch |
| 7,672,358 B2 | 3/2010 | Abraham et al. |
| 7,702,003 B2 | 4/2010 | Pietila et al. |
| 7,881,407 B2 | 2/2011 | Chansarkar et al. |
| 2006/0083293 A1 | 4/2006 | Keegan et al. |
| 2006/0274818 A1 | 12/2006 | Gilmour et al. |
| 2007/0098055 A1 | 5/2007 | Raman et al. |
| 2007/0211793 A1 | 9/2007 | Han |
| 2009/0121928 A1 | 5/2009 | Pon |
| 2009/0207891 A1 | 8/2009 | Pon |
| 2010/0019960 A1 | 1/2010 | Van Diggelen et al. |
| 2010/0135365 A1 | 6/2010 | Chen et al. |
| 2010/0328151 A1 | 12/2010 | Shirai |
| 2012/0100799 A1 | 4/2012 | Tsuchimoto et al. |
| 2013/0016007 A1* | 1/2013 | Yamamoto ............. G01S 19/22 342/357.26 |

FOREIGN PATENT DOCUMENTS

| | | |
|---|---|---|
| JP | 2011-247766 | 12/2011 |
| JP | 2012-098185 | 5/2012 |
| JP | 2012-100087 | 5/2012 |

OTHER PUBLICATIONS

Brodin et al., "GNSS Code and Carrier Tracking in the Presence of Multipath," International Journal of Satellite Communications, vol. 15, 25-34 (1977).

Chinese Office Action corresponding to Chinese Application No. CN201310677052.8 issued Dec. 27, 2016.

* cited by examiner

METHOD AND APPARATUS TRACKING GLOBAL NAVIGATION SATELLITE SYSTEM (GNSS)

CROSS-REFERENCE TO RELATED APPLICATIONS

This application claims the benefit of Korean Patent Application No. 10-2012-0144801 filed on Dec. 12, 2012, the subject matter of which is hereby incorporated by reference.

BACKGROUND

The inventive concept relates to signal processing methods, and more particularly, to methods and apparatuses for tracking the signal of a global navigation satellite system (GNSS). The inventive concept also relates to satellite signal receivers including such apparatuses and/or using such methods.

The GNSS is essentially a group of systems collectively capable of locating the position of a target object and then providing location information to a terrestrial receiving device regarding the target object using an array of satellites.

The GNSS includes the global positioning system (GPS) operated by the United States, the global navigation satellite system (GLONASS) operated by Russia, and the Galileo positioning system operated by the European Union. In order to operate efficiently the GNSS must acquire and track satellite signal(s). There are many difficulties associated with this process and numerous environmental and operating effects degrade the quality and receptivity of satellite signals. One of these degrading effects is called "multi-path." Multi-path is signal transmission phenomenon in which two or more different (e.g., time or phase) versions of the same signal, having been propagated along different transmission paths, are commonly received by a receiver. Research is currently being conducted into ways of identifying and reducing the performance degrading effects of multi-path in the GNSS.

SUMMARY

The inventive concept provides a signal processing method, and more particularly, provides a method and apparatus for tracking a signal of a global navigation satellite system (GNSS), and a satellite signal receiver including the same, which is capable of detecting effects of multi-paths and compensating for the effects when acquiring and tracking a satellite signal from the GNSS.

According to an aspect of the inventive concept, there is provided a method of tracking a signal in a satellite navigation system, the method including: generating replica codes comprising an E code, a P code, an L code, and a first and a second codes; calculating a plurality of correlation values for a received signal and the replica codes; discriminating between gradients of a plurality of slopes derived from correlation points respectively corresponding to the replica codes; and detecting a time delay due to multipath signal components according to a result of the discriminating.

The method of tracking a signal may further include calculating a compensation value for compensating for a delay error of a current synchronization time point according to a result of the detecting of the time delay.

Each of the correlation points may be positioned on a correlation response graph on a plane having a time delay and a correlation value as each axis.

The discriminating of the gradients of the plurality of slopes may include discriminating between each gradient sign and each gradient value of the plurality of slopes.

The detecting of the time delay may include detecting the time delay on the basis of results of comparing the gradient signs and the gradient values of the plurality of slopes.

The discriminating of the gradients of the plurality of slopes may include: deriving a first slope connecting an E point and a first point, a second slope connecting the first point and a P point, a third slope connecting an L point and the second point, and a fourth slope connecting the second point and the P point; and discriminating between each gradient of the first to fourth slopes.

The detecting of the time delay may include detecting the time delay according to a result of comparing at least one of the gradient signs and the gradient values.

The detecting of the time delay may include: comparing gradient signs of the first slope and the second slope; comparing gradient signs of the third slope and the fourth slope; and comparing an absolute value of a difference of gradient values between the first slope and the second slope with an absolute value of a difference of gradient values between the third slope and the four the slope.

The detecting of the time delay may include: generating any one comparison result combination from among a plurality of comparison result combinations by comparing the gradients of the slopes; and applying different time delay detecting schemes according to the generated comparison result combination.

The first code may have a greater time delay than the E code and a lesser time delay than the P code, and the second code may have a greater time delay than the P code and a lesser time delay than the L code.

The generating of the replica codes may further include generating third to n-th codes (where n is an integer of 3 or greater) having different time delays, and the discriminating between the gradients further comprises using a third to n-th correlation points corresponding to the third to n-th codes (where n is an integer of 3 or greater).

According to another aspect of the inventive concept, there is provided an apparatus for tracking a signal in a satellite navigation system, the apparatus including: a replica code generator generating replica codes including an E code, a P code, an L code, and at least two codes; a correlation value calculating unit calculating a plurality of correlation values by using a received signal and the replica codes; a gradient discriminator discriminating between gradients of a plurality of slopes derived from correlation points respectively corresponding to the replica codes; and a processing unit detecting a time delay due to multipath signal components according to a result of the discriminating, and outputting a compensation value according to the detected time delay.

According to still another aspect of the inventive concept, there is provided a satellite signal receiver including: a radio frequency (RF) module performing frequency conversion on a received satellite signal; and a signal processing unit comprising a signal acquiring module performing a signal acquiring operation for the frequency converted satellite signal, and a signal tracking module performing a signal tracking operation, wherein the signal tracking module generates replica codes comprising an E code, a P code, an L code, and at least two codes to calculate a plurality of correlation values for the satellite signal, derives a plurality of slopes from correlation points respectively corresponding to the replica codes to discriminate between a gradient of each of the slopes, and detects a time delay due to multipath signal components of the satellite signal on the basis of a gradient discrimination result.

According to still another aspect of the inventive concept, there is provided a satellite signal receiver including: a signal processing unit performing a signal tracking operation for a received signal, wherein the signal processing unit includes: first to third correlators outputting first to third correlation values for the received signal and an E code, a P code, and an L code, respectively; fourth and fifth correlators outputting fourth and fifth correlation values respectively for the received signal and first and second codes having different time delays from the E code, the P code, and the L code; and a processing unit detecting time delays due to multipath signal components on the basis of difference values between at least some of the first to fifth correlation values, and calculating a compensation value according to a result of the detecting.

BRIEF DESCRIPTION OF THE DRAWINGS

Certain embodiments of the inventive concept are illustrated in the accompanying drawings in which.

DETAILED DESCRIPTION

Certain embodiments of the inventive concept will now be described in some additional detail with reference to the accompanying drawings. The inventive concept may, however, be variously embodied and should not be construed as being limited to only the illustrated examples. Rather the illustrated embodiments are presented to allow those skilled in the art to gain a sufficient understanding of the making and use of the inventive concept, as well as certain objectives accomplished by various implementations of the inventive concept. Throughput the written description and drawings, like reference numbers and labels denote like or similar elements.

As used herein, the term "and/or" includes any and all combinations of one or more of the associated listed items. Expressions such as "at least one of" when preceding a list of elements, modify the entire list of elements and do not modify the individual elements of the list.

Figure 1:
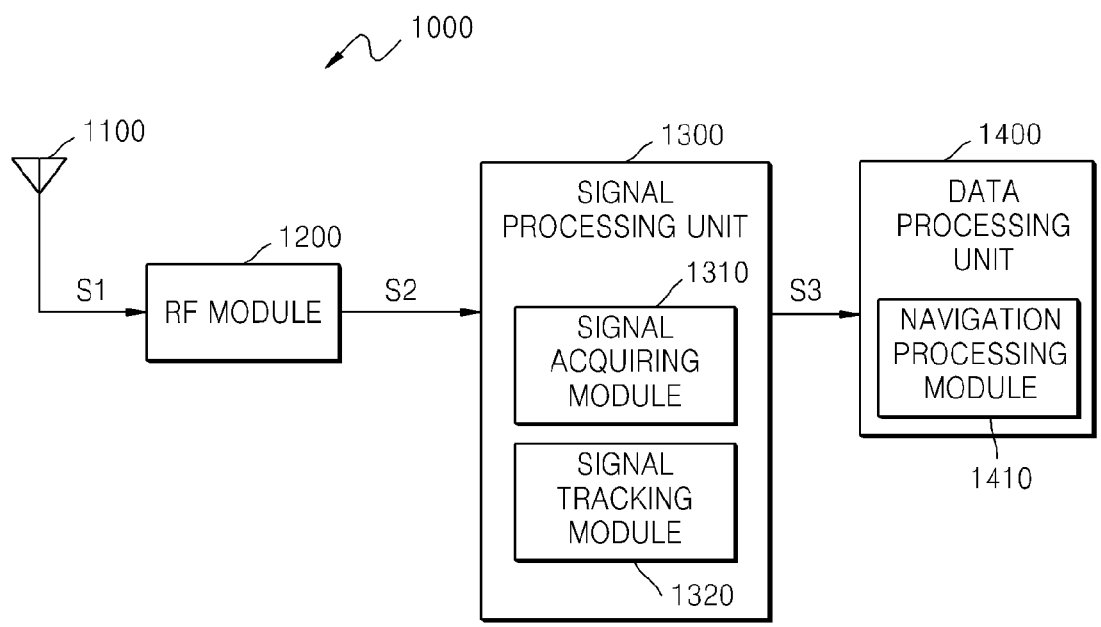
FIG. 1 is a block diagram illustrating a satellite signal receiver according to an embodiment of the inventive concept.

FIG. 1 is a block diagram illustrating a satellite signal receiver 1000 according to an embodiment of the inventive concept. As illustrated in FIG. 1, the satellite signal receiver 1000 comprises an antenna 1100, a radio frequency (RF) module 1200, a signal processing unit 1300, and a data processing unit 1400. The satellite signal receiver 1000 may be used to receive a satellite signal consistent with the technical specifications of the global navigation satellite system (GNSS). Accordingly, the satellite receiver 1000 of FIG. 1 may be considered a "GNSS receiver". Consistent with certain embodiments of the inventive concept, the satellite signal receiver 1000 may be mounted on a terminal to which a GNSS service function is applied, such as a mobile terminal, a notebook, a personal digital assistant (PDA), a smartphone, a portable media player (PMP), or a navigation device.

The antenna 1100 may be used to discriminate and receive an analog satellite signal S1 broadcast by the GNSS system. The RF module 1200 may be used to amplify the satellite signal S1 passed by the antenna 1100 and to perform certain signal processing functions such as noise filtering and analog-to-digital conversion. In this manner, the RF module 1200 may be used to convert the analog satellite signal received by the antenna 1100 into a digital intermediate (IF) signal S2 ready for further signal processing by the signal processing unit 1300.

Thus, the signal processing unit 1300 is able to acquire and track the satellite signal received by the satellite signal receiver 1000 using the digital IF signal S2. In the illustrated example of FIG. 1, the signal processing unit 1300 includes a signal acquiring module 1310 configured to acquire the satellite signal, and a signal tracking module 1320 configured to track the acquired signal in order to more precisely determine a temporal synchronization point for the acquired satellite signal. The signal processing unit 1300 may be implemented using various combinations of hardware and/or software. In certain embodiments of the inventive concept, a processor may be used to performing the functions of acquiring and tracking the satellite signal.

In certain embodiments, the signal acquiring module 1310 may calculate satellite signal search values according to a correlation between a Doppler frequency and a code delay for each search period in a 2-dimensional searching area mathematically defined by a Doppler frequency delay axis and a code delay axis. As an example, the signal acquiring module 1310 may calculate satellite signal search values according to a correlation between a Doppler frequency and a code delay on the basis of an initial Doppler frequency search start value and an initial Doppler frequency search period value. Hence, in one example, a satellite signal acquiring operation may be sequentially performed for respective codes associated with each one of a plurality of satellites.

In addition, the signal acquiring module 1310 may be used to determine whether satellite signal detection has succeeded on the basis of the calculated satellite signal search values. That is, if the satellite signal detection fails, the signal acquiring module 1310 may repeat the satellite signal acquiring operation after varying the initial Doppler frequency search period value. As an example, if the signal acquiring module 1310 fails to detect the satellite signal during a satellite signal acquiring operation based on an initial Doppler frequency search start value and an initial Doppler frequency search period value, then the signal acquiring module 1310 may repeat the satellite signal acquiring operation after varying the Doppler frequency search period value from (e.g.,) ½ or 1/N (where N is an integer greater than 2) for the initial Doppler frequency search start value, or after shifting the phase of the initial Doppler frequency search start value by (e.g.,) π/2 or π/N. Alternatively, the satellite signal acquiring operation may be repeated after both phase shifting the Doppler frequency search start value and varying the Doppler frequency search period value.

Meanwhile, the signal tracking module 1320 may be used to more accurately determine code synchronization for the received satellite signal, and thereafter to maintain the code synchronization. In one signal tracking scheme consistent with certain embodiments of the inventive concept, a delay locked loop having an Early minus Late discriminator (EL-DLL) is used. That is, the signal tracking module 1320 may use an EL-DLL signal tracking scheme, wherein the EL-DLL obtains "early correlation values" between an Early replica code and a code associated with the received satellite signal, and "late correlation values" between a Late replica code and the code associated with the received satellite signal. Then, the signal tracking module 1320 may determine a point in time when a difference between an early correlation value and a late correlation value becomes 0. This point in time is identified as an optimal synchronization time, and the optimal synchronization time may thereafter be used to precisely maintain satellite signal tracking.

Thus, the signal tracking module 1320 may be used to generate "replica codes" that may be used to calculate correlation values with the code (e.g., a pseudo random noise (PRN) code) associated with the received satellite signal (hereafter, "satellite signal code"). For example, the signal tracking module 1320 may be used to generate a prompt code (hereinafter, "P code") representing a current synchronization time point, an Early code (hereinafter, "E code") representing an early time point, and a Late code (hereinafter, "L code") representing a late time point. The signal tracking module 1320 may include a number of correlators that may respectively be used to calculate correlation values between the replica code and the satellite signal code, and provide the resulting correlation values.

In terms of a time delay with respect to a P point corresponding to the current synchronization time point, respective E points and L points will be symmetrically defined. Hence, a difference value between a correlation value for an E code (hereinafter, "E correlation value") and a correlation value for a corresponding L code (hereinafter, "L correlation value") may be readily calculated. When the E correlation value minus the L correlation value is a negative value, it may be determined that the current synchronization time point is earlier than the optimal synchronization time point. Accordingly, the current synchronization time point should be increased. In contrast, when the E correlation value minus the L correlation value is a positive value, it may be determined that the current synchronization time point is later than the optimal synchronization time point. Accordingly, the current synchronization time point should be decreased. A series of tracking steps may be repeated in this manner until the E correlation value minus the L correlation value becomes 0, thereby establishing the current synchronization time point as the optimal synchronization time point.

For the signal tracking scheme using the EL-DLL, an optimal synchronization time point may be readily provided in an ideal environment in which multipath signal components do not exist. However, large tracking deviations may occur in real world environments in which multipath signal components are quite common.

Therefore, according to certain embodiments of the inventive concept, the signal tracking module 1320 of FIG. 1 may be used to generate replica codes in additional to the E code and L code. Such a signal tracking module 1320 will also include one or more additional correlator(s) in order to calculate correlation values corresponding to the additional replica codes. In this manner, the signal tracking module 1320 may analyse correlation values calculated from the additional replica codes together with E and L correlation values calculated from E code and L code. This approach provides the ability to detect tracking deviations due to the multipath signals, and allows further adjustment of a current synchronization time point according to the detected tracking deviations in order to ultimately derive the optimal synchronization time point.

In FIG. 1, the data processing unit 1400 performs navigation data extraction and position calculation within the satellite signal receiver 1000 in accordance with a "synchronized satellite signal" S3 provided by the signal processing unit 1300. As an example, the date processing unit 1400 may include a navigation processing module 1410 capable of performing a navigation process of extracting satellite navigation information from the received, acquired, tracked and synchronized satellite signal. The navigation process may calculate a satellite state (e.g., position, velocity, acceleration, and/or the like) relative to the target object in order to obtain position information and/or time information using the using the extracted satellite navigation information.

Figure 2:
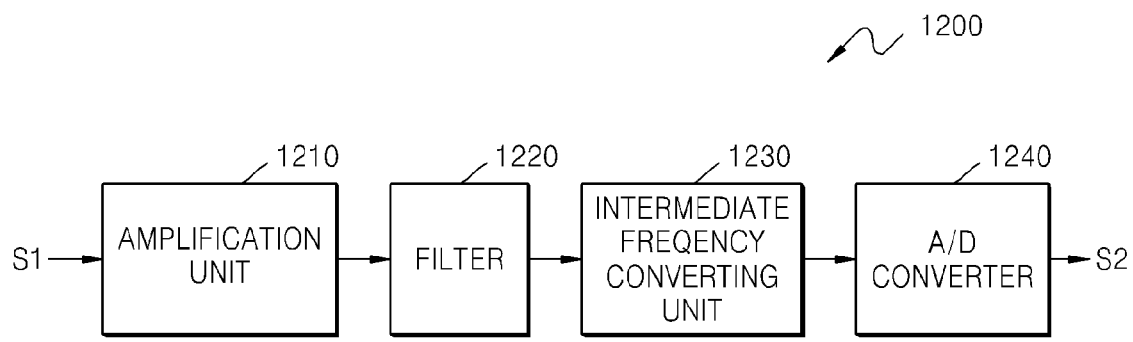
FIG. 2 is a block diagram further illustrating in one example the RF module 1200 of FIG. 1.

FIG. 2 is a block diagram further illustrating in one example the RF module 1200 of FIG. 1. As illustrated in FIG. 2, the RF module 1200 may include an amplification unit 1210, a filter 1220, an intermediate frequency converting unit 1230, and an analog-to-digital (A/D) converter 1240.

The amplification unit 1210 receives the analog satellite signal S1 via the antenna 1100, and amplifies the satellite signal S1 to have a signal strength sufficient to enable analog-to-digital conversion. The filter 1220 may be used to limit (i.e., band pass) the frequency of the amplified satellite signal and remove noise.

Then, the intermediate frequency (IF) converting unit 1230 performs a frequency conversion process that converts the relatively high frequency satellite signal provided by the filter 1220 into an appropriate (and relatively low frequency) IF signal. Finally, the A/D converter 1240 converts the analog IF signal into a corresponding digital IF signal S2. That is, the A/D converter 1240 convert the analog IF satellite signal into the digital IF satellite signal S2 having a predetermined number of bits derived using a predetermined sampling frequency.

Figure 3:
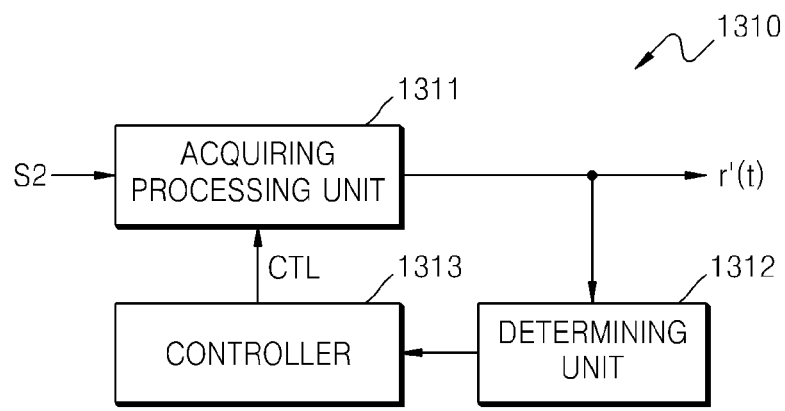
FIG. 3 is a block diagram further illustrating in one example the signal acquiring module 1310 of FIG. 1.

FIG. 3 is a block diagram further illustrating in one example the signal acquiring module 1310 of FIG. 1. The signal acquiring module 1310 may include an acquiring processing unit 1311, a determining unit 1312 and a controller 1313.

The acquiring processing unit 1311 receives the digital IF signal S2 and calculates from the digital IF signal S2 certain satellite signal search values derived from correlations between Doppler frequencies and code delays for each given search period in a 2-dimensional search area. The operation of calculating the satellite signal search values may be performed using control signals CTL provided by the controller 1313. As an example, the control signals CTL may determine respective Doppler frequency search start values and Doppler frequency search periods.

The determining unit 1312 determines whether the satellite signal detection operations succeed on the basis of the calculated satellite signal search values. As an example, the determining unit 1312 may determine that a satellite signal detection is successful when at least one of the following conditions is satisfied: (1) a difference between a greatest value and a second greatest value among satellite signal search values is greater than initial first threshold value; and (2) the greatest value is greater than an initial second threshold value. The determining unit 1312 may then provide to the controller 1313 determination information indicating whether the satellite signal detection was successful.

The controller 1313 generates the control signals CTL to change search conditions on the basis of the determination information provided by the determining unit 1312. As an example, the controller 1313 may generate the control signals CTL to select a Doppler frequency search start value and a Doppler frequency search period value as the initial values to be used during a first satellite signal acquiring operation. If the satellite signal detection operation using the initial values fails, the controller 1313 may then generate control signals CTL to reselect the Doppler frequency search period value, and the acquiring processing unit 1311 may again perform the satellite signal detecting operation under such changed conditions.

Figure 4:
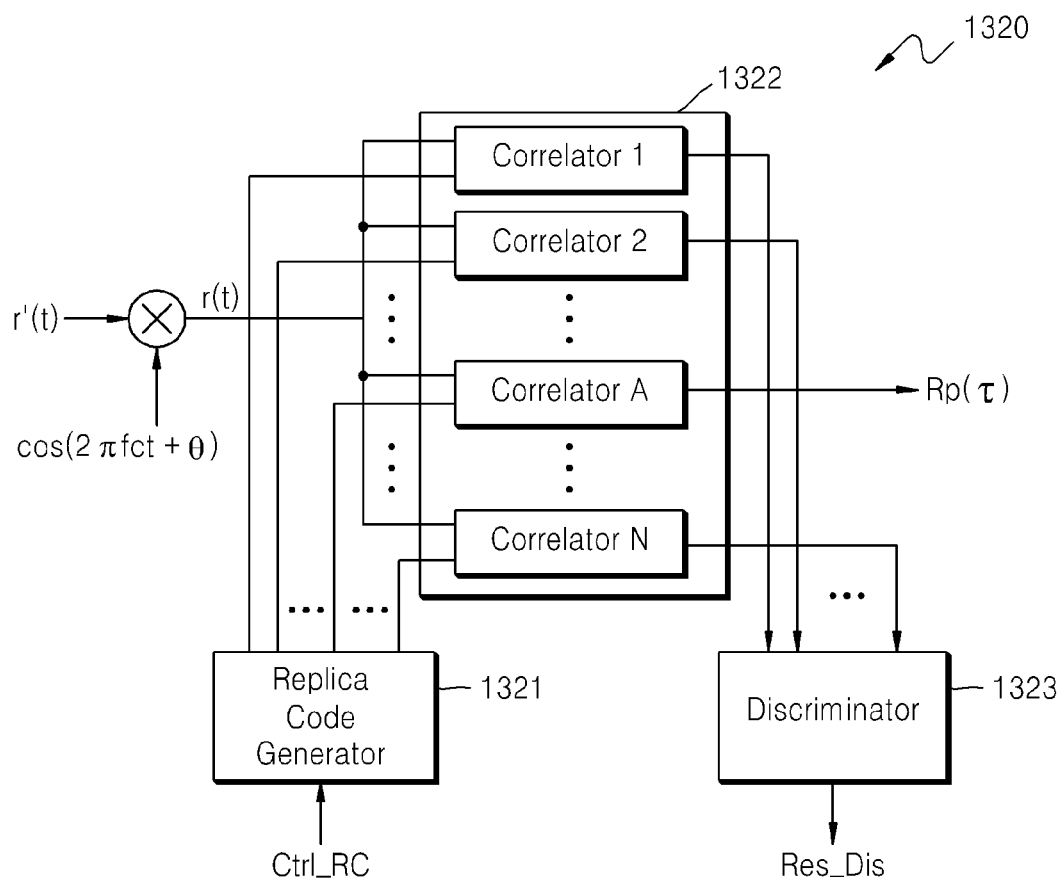
FIG. 4 is a block diagram further illustrating in one example the signal tracking module 1320 of FIG. 1.

FIG. 4 is a block diagram further illustrating in one example the signal tracking module 1320 of FIG. 1. The signal tracking module 1320 may be used to repeatedly perform a signal tracking operation according to an EL-DLL tracking scheme, for example. For this, the signal tracking module 1320 may include a replica code generator 1321, a correlation value calculating unit 1322, and a discriminator 1323.

In operation the signal tracking module 1320 first performs a demodulation operation on a satellite signal r' (t) acquired by the signal acquiring module 1310. Demodulation may be accomplished by multiplying a carrier wave $(\cos(2\pi fct+\theta))$ having a central frequency "fc" by the acquired satellite signal r'(t). The resulting demodulated satellite signal (hereinafter, the received satellite signal r(t)) is provided to the correlation value calculating unit 1322.

The correlation value calculating unit 1322 includes a number of correlators (Correlator 1 though Correlator N) each commonly receiving the received satellite signal r(t). Each one of Correlator 1 through Correlator N respectively calculates a correlation value for a satellite signal code (e.g., a PRN code) associated with the received satellite signal r(t) and the replica codes. Among the Correlator 1 through Correlator N in the illustrated example of FIG. 4, an $A^{th}$ Correlator calculates a correlation value $R_P(\tau)$ by using a replica code (P code) representing the current synchronization time point.

The replica code generator 1321 may be used to generate replica codes including (e.g.,) the P code, E code, and L code as described above. Thus, assuming the correlation calculating unit 1322 includes N correlators, the replica code generator 1321 may generate N replica codes each having different time delays, wherein the P code is provided by an $A^{th}$ correlator, Correlator A, calculating a P correlation value $R_P(\tau)$, the E code is provided by a first correlator, Correlator 1, and the L code is provided by an $N^{th}$ correlator, Correlator N. One or more additional replica codes having a time delay ranging between the P code and E code may be respectively provided by the second through $(A-1)^{th}$ correlators, and one or more additional replica codes having a time delay ranging between the P code and L code may be respectively provided by an $(A+1)^{th}$ through $(N-1)^{th}$ correlators.

As described above, in a multipath signal environment, the received satellite signal r(t) will often include multipath signal components. In such cases, tracking deviations may remain even after an "optimal" synchronization time point has been conventionally determined Thus, according to certain embodiments of the inventive concept, the signal tracking module 1320 is able to detect and compensate for multipath effects—that would conventionally cause a synchronization error—using at least two "additional correlators" to predict a time shift from a P point and compensate for this time shift.

In the signal tracking module 1320 of FIG. 4, the discriminator 1323 performs a discrimination operation using one or more correlation values provided by the correlation value calculating unit 1322, and outputs corresponding discriminated results Res_Dis. As an example, the discriminator 1323 may receive an E correlation value and an L correlation value from the correlation value calculating unit 1322, and determines a difference between the E correlation value and the L correlation value. As described above, the current synchronization time point may then be increased or decreased according to the E and L correlation values, and this tracking operation may be repeated until a difference between the E correlation value and the L correlation value becomes 0.

Meanwhile, correlation values derived from the additional replica codes (that is replica codes other than and in addition to the E and L codes) are also provided to the discriminator 1323. The discriminator 1323 may therefore mathematically analyse the E and L correlation values, and the additional correlation values and outputs the analysis result. For example, the correlation values for the samples of the received satellite signal may be drawn in a type of correlation response graph on a plane having a time delay and a correlation value as respective axes. Also, each correlation value corresponding to each replica code may be represented as each correlation point (for example, E, P, or L point) on the correlation response graph, and a plurality of slopes connecting two points among the points may be obtained. The discriminator 1323 analyzes the correlation response to calculate signs and values of gradients of the slopes, and further outputs the calculation result as the determination result Res_Dis.

The determination results Res_Dis provided by the discriminator 1323 may be processed by other signal processing devices (not shown in FIG. 4) in the signal tracking module 1320. According to the processing result, a replica code control signal Ctrl_RC is generated and provided to the replica code generator 1321. The replica code generator 1321 may control a time delay for the replica code in response to the replica code control signal Ctrl_RC, and provide the delay-controlled replica code to the correlation calculating unit 1322.

Figure 5A:
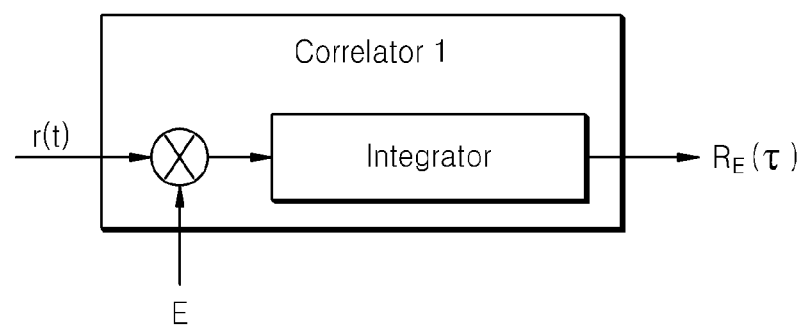
FIG. 5A is a block diagram further illustrating in one example a correlator that may be used in the signal tracking module 1320 of FIG. 4.
Figure 5B:
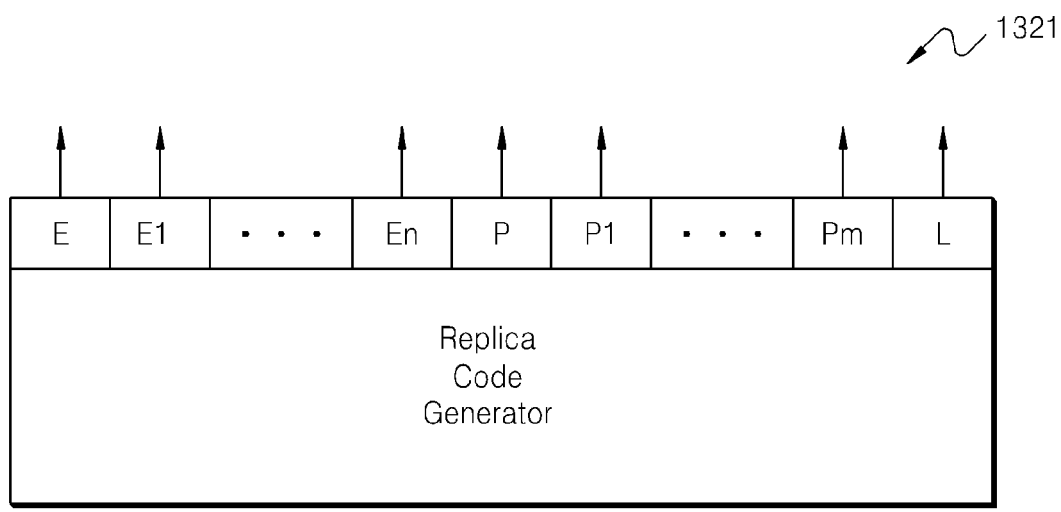
FIG. 5B is a block diagram further illustrating in one example the replica code generator 1321 of FIG. 4

FIG. 5A is a block diagram further illustrating in one example any one or all of the correlators incorporated in the signal tracking module 1320 of FIG. 4. FIG. 5B is a block diagram further illustrating in one example the replica code generator 1321 of FIG. 4.

As illustrated in FIG. 5A, when the first correlator, Correlator 1, outputs a correlation value related to the received satellite signal r(t) and the E code. That is, the first correlator, Correlator 1, performs a multiplication and integration operation between the received satellite signal r(t) and the E code (E) in order to output a corresponding E correlation value $R_E(\tau)$. Similarly, the $A^{th}$ correlator, Correlator A, will output a correlation value related to the received satellite signal r(t) and the P code as a P correlation value $R_P(\tau)$. Similarly, the Nth the correlator, Correlator N, will output a correlation value related to the received satellite signal r(t) and the L code as a L correlation value $R_L(\tau)$.

As illustrated in FIG. 5B, the replica code generator 1321 may generate a plurality of replica codes. As described above, the replica code generator 1321 generates two or more replica codes having different time delays from E, P and L codes, besides generation of the E, P, and L codes. For example, the replica code generator 1321 may further generate one or more replica codes E1 to En having a time delay between the E code and the P code, and one or more replica codes P1 to Pm having a time delay between the P code and the L code.

Figure 6:
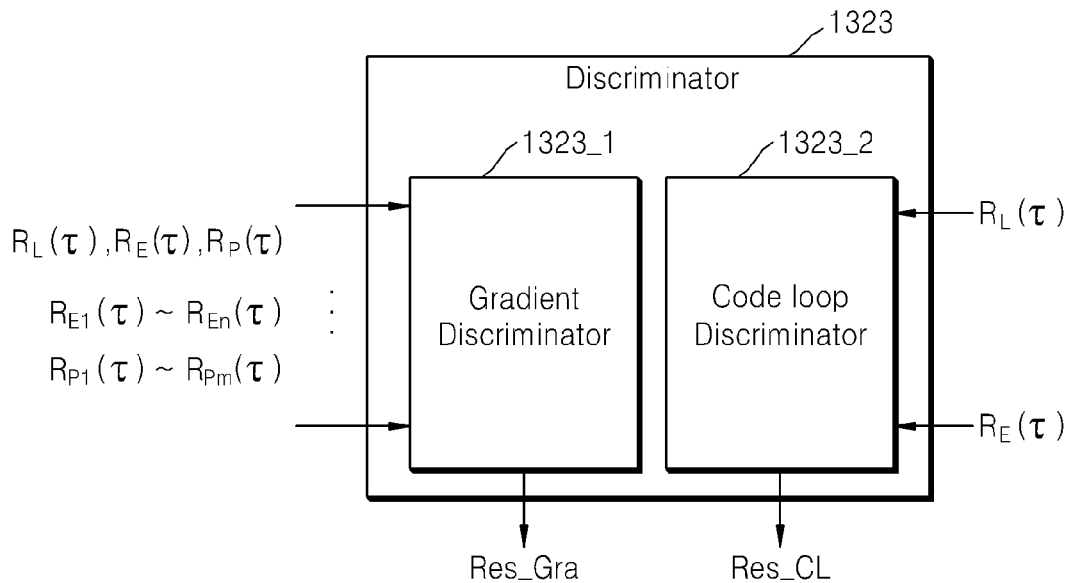
FIG. 6 is a block diagram further illustrating in one example the discriminator 1323 of FIG. 4.

FIG. 6 is a block diagram further illustrating in one example the discriminator 1323 of FIG. 4. As illustrated in FIG. 6, the discriminator 1323 may include a gradient discriminator 1323_1 and a code loop discriminator 1323_2.

The correlation values generated by the correlation calculating unit 1322 are provided to the discriminator 1323. For example, the E correlation value $R_E(\tau)$ and the L correlation value $R_L(\tau)$ are provided to the code loop discriminator 1323_2, and the code loop discriminator 1323_2 determines a difference value between the E correlation value $R_E(\tau)$ and the L correlation value $R_L(\tau)$, and generates a first determined result Res_CL. In addition, the gradient discriminator 1323_1 may further receive additional correlation values (e.g., $R_{E1}(\tau)$ through $R_{En}(\tau)$, and $R_{P1}(\tau)$ through $R_{Pm}(\tau)$) in addition to the E, P, and L correlation values $R_E(\tau)$, $R_P(\tau)$, and $R_L(\tau)$. Thus, the gradient discriminator 1223 may generate a second determined result Res_Gra by determining gradients for a number of slopes derived from the resulting constellation of correlation points. For example, each slope may be derived from a corresponding line connecting two correlation points, such that a number of slopes may be variously derived using the multiplicity of correlation points. In this manner, the second determined result Res_Gra may be determined using gradients derived from a plurality of slopes.

Figure 7:
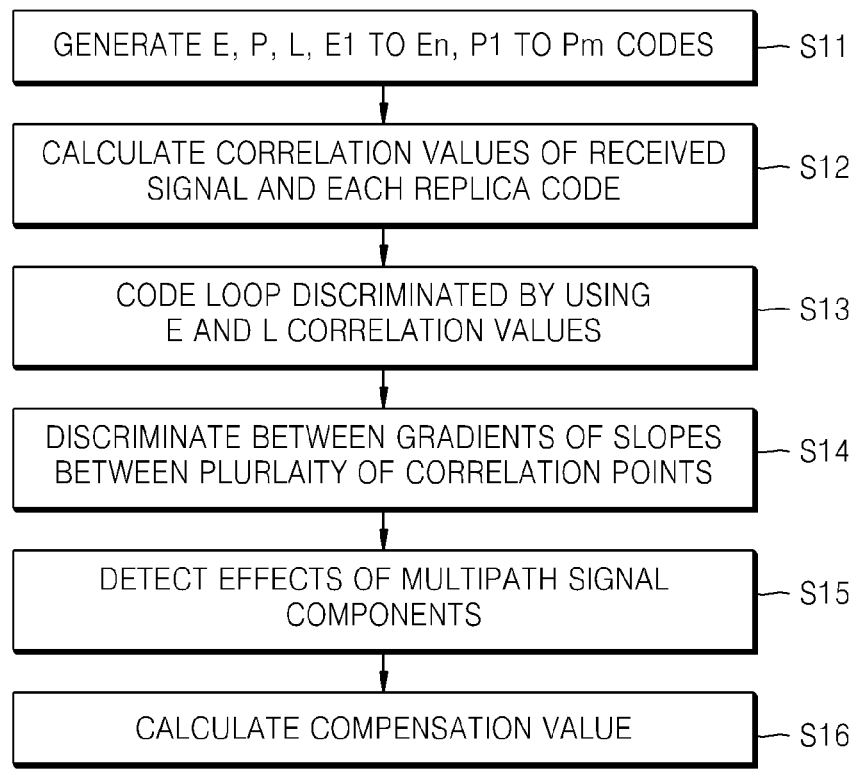
FIG. 7 is flowchart summarizing one possible signal tracking method according to an embodiment of the inventive concept.

FIG. 7 is a flowchart summarizing a signal tracking method according to an embodiment of the inventive concept.

As illustrated in FIG. 7, replica codes (e.g., E, P, and L codes) are generated as the result of signal tracking, as well as additional codes (e.g., E1 through En codes and P1 through Pm codes) (S11). The additional E1 through En codes (and P1 through PN codes) have respectively different time delays from the E, P, and L codes. Those skilled in the art will recognize that the denominated "E1 through En codes" and the "P1 through PN codes" are merely representative of any two or more replica codes other than the E, P, and L codes. Thus, one or more (lower) additional replica codes having a time delay ranging between the E and P codes, and one or more (upper) additional replica codes having a time delay ranging between the P and L codes may be generated.

Next, correlation values between a satellite signal code (e.g., PRN) and the various replica codes are calculated (S12), and accordingly, correlation values (e.g., E1 through En correlation values, and P1 through PN correlation values) using the additional replica codes are calculated together with the E, P, and L correlation values. A discrimination operation for the calculated correlation values may be performed (e.g., a difference value between the E correlation value and the L correlation value may be determined). Then, a code loop is discriminated using the E and L correlation values (S13), and a current synchronization time point adjusted (increased or decreased) according to the discrimination result.

In addition, using the calculated plurality of correlation values, a tracking deviation in a multipath environment may be detected and compensated for. As described above, assuming a planar correlation response graph having a time delay and a correlation value as respective axes, two or more slopes are derived in relation to correlation points, and a gradient (e.g., a sign or a value of the gradient) for each of a number of slopes may be discriminated therebetween (S14). Then, effects due to the multipath signals are detected by analysing the discrimination result of the gradients (S15), and a time delay for the current synchronization time point may be calculated according to the detection result. A compensation value may then be calculated in relation to the calculated time delay (S16), and a delay error compensating for the multipath signal components may be defined on the basis of the compensation value.

Figure 8:
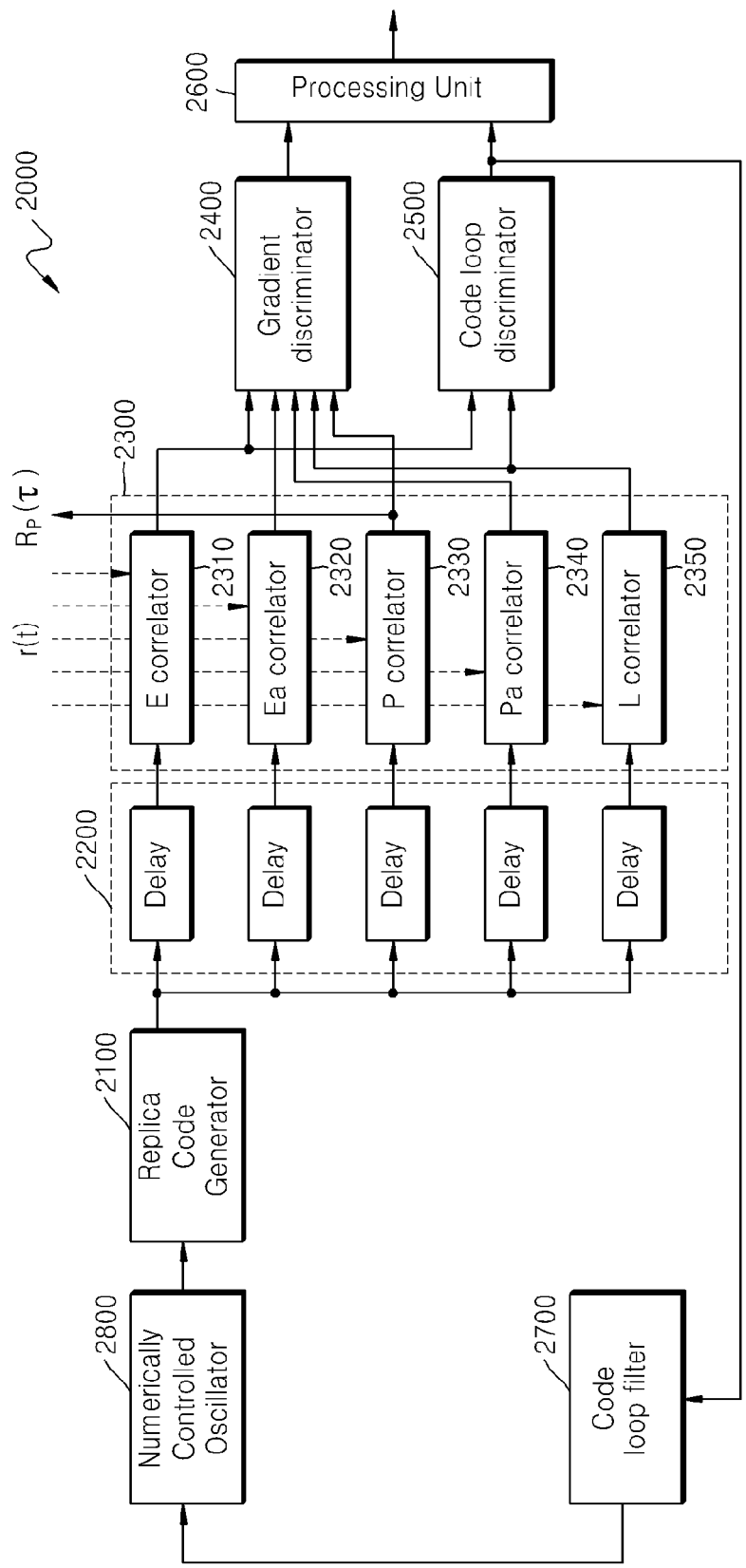
FIG. 8 is a block diagram illustrating a tracking processing module that may be incorporated into a signal receiver according to an embodiment of the inventive concept.

FIG. 8 is a block diagram illustrating in one example a tracking processing module that may be used on a signal receiver according to an embodiment of the inventive concept. As illustrated in FIG. 8, the tracking processing module 2000 may include a replica code generator 2100, a delay unit 2200, a correlation calculating unit 2300, a gradient discriminator 2400, a code loop discriminator 2500, a processing unit 2600, a loop filter 2700, and an oscillator 2800. As an example, the replication code generator 2100 may generate replication codes capable of being synchronized with a signal receiver. The delay unit 200 may include a plurality of delays, for example, 5 delays for generating 5 replica codes including two codes besides E, P, and L codes by adjusting each time delay of the replica codes generated in the replica code generator 2100. In addition, as described above, the delay unit 2200 may be included in the replica code generator 2100.

Meanwhile, the correlation value calculating unit 2300 may include a plurality of correlators (e.g., 5 correlators) respectively used when correlation values associated with the received satellite signal r(t) are calculated by using 5 corresponding replica codes. Accordingly, when E, P, L, Ea, and Pa codes are provided from the replica code generator 2100 and the delay unit 2200, the correlation value calculating unit 2300 may include a first correlator (E correlator) 2310 outputting the E correlation value, a second correlator (Ea correlator) 2320 outputting the Ea correlation value, a third correlator (P correlator) 2330 outputting the P correlation value, a fourth correlator (Pa correlator) 2340 outputting the Pa correlation value, and a fifth correlator (L correlator) 2350 outputting the L correlation value. The P correlation value $R_P(\tau)$ corresponds to a correlation value using a P code representing the current synchronization time point.

The calculated correlation values are provided to the gradient discriminator 2400 and the code loop discriminator 2500. For example, the E correlation value and the L correlation value are provided to the code loop discriminator 2500 and a result of discriminating a difference value between the E correlation value and the L correlation value is generated. Also, the E, P, L, Ea, and Pa correlation values are provided to the gradient discriminator 2400, and the gradient discriminator 2400 outputs discriminated gradients of a plurality of slopes derived from the E, P, L, Ea, and Pa points. The discrimination result of the difference result between the E correlation value and the L correlation value, and the discrimination result of the gradients of the plurality of slopes are provided to the processing unit 2600.

The processing unit 2600 performs a signal processing operation using the received discrimination results (e.g., using the discrimination results) to detect effects due to multipath and to output a compensation value for a delay error according to the multipath on the basis of the detection result. A discrimination result for the difference value between the E correlation value and the L correlation value from the code loop discriminator 2500 is provided as a control signal to the replica code generator 2100 through the loop filter 2700 and the oscillator 2800. The replica code generator 2100 shifts to output phases of the replica codes in response to the control signal. FIG. 8 illustrates an example to which a numerically controlled oscillator (NCO) is used as a general example of the oscillator 2800.

The correlation value from the correlation value calculating unit 2300, for example, the P correlation value output from the third correlator (P correlator) 2330 and the compensation value from the processing unit 2600 may be provided to a navigation processing module (not illustrated) for navigation processing, and the navigation processing module performs a navigation process by using this.

Figure 9:
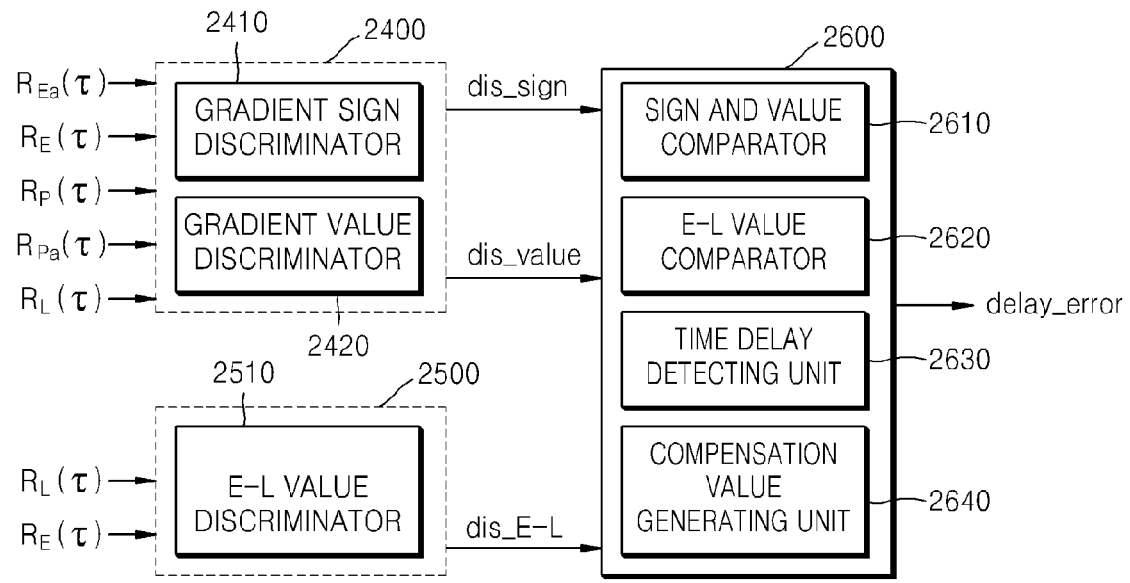
FIG. 9 is a block diagram further illustrating in one example the gradient discriminator 2400 and code loop discriminator 2500 of FIG. 8.

FIG. 9 is a block diagram further illustrating in respective examples the gradient discriminator 2400 and the code loop discriminator 2500 of FIG. 8. As illustrated in FIG. 9, the gradient discriminator 2400 may include a gradient sign discriminator 2410 discriminating signs (+ or − sign) of the gradients of the plurality of slopes, and a gradient value discriminator 2420 discriminating gradient values of the gradients of the plurality of slopes. A result of discriminating the gradients of the plurality of slopes may be provided to the processing unit 2600 as a first discrimination result (dis_sign). Also, the gradient value discriminator 2420 provides discrimination results of the gradient values of respective slopes to the processing unit 2600 as the second discrimination result (dis_value).

In addition, the code loop discriminator 2500 includes an E-L value discriminator 2510, which provides a result of discriminating between the E correlation value and the L correlation value to the processing unit 2600 as a third discrimination result (dis_E-L).

As shown in FIG. 9, the processing unit 2600 may include a sign and value comparator 2610, an E-L value comparator 2620, a time delay detecting unit 2630, and a compensation value creating unit 2640. The processing unit 2600 receives discrimination results from the gradient discriminator 2400 and the code loop discriminator 2500, detects effects due to multipath signal components using the discrimination results, and outputs a calculated delay error for the P code representing a synchronization time point.

As an example, the sign and value comparator 2610 may be used to compare two or more slopes having the same sign gradients, or different sign gradients on the basis of first and second discrimination results (dis_sign) and (dis_value). Also the sign and value comparator 2610 may be used to compare whether gradients of two or more slopes are the same or different values. Also, the E-L value comparator 2620 compares whether the E correlation value and the L correlation value are the same on the basis of the third discrimination result (dis_E-L). In order to detect a synchronization time point of the P point, a tracking operation may be repeated until the E correlation value and the L correlation value have the same value. When the E and L correlation values become the same, the E-L comparator 2620 generates the comparison result which may be used to detect a relative optimal delay value for the P point even in a state where the signal tracking state is not stable.

The time delay detecting unit 2630 detects a time delay value of the P point on the basis of the comparison results. For example, even through the synchronization time point is determined in a state where the E and L correlation values are the same, a time delay for the P point occurs when the multipath signal components are present. Then, the time delay detecting unit 2630 compares the comparison results to output the detecting result of the time delay for the P point due to multipath signal components. The compensation value creating unit 2640 creates a compensation value delay_error for shifting a phase of the P code on the basis of the detected time delay.

Hereinafter, an operation of detecting the time delay for the P point due to multipath signal components, and compensating for the time delay according to an embodiment of the inventive concept will be described.

Signals processed in a satellite signal receiver according to embodiments of the inventive concept may include the multipath signal components as well as a line-of-sight (LOS) signal (i.e., a direct path signal). The multipath signal components are a version of the LOS signal experiencing a time delay, a phase shift, and/or signal strength attenuation. According to the phase shift and the time delay, the LOS signal components and the multipath signal components may have the same phase, and in this case, a synthesis signal that the two signal components are synthesized may have a greater amplitude (constructive interference) than each component. Alternatively, when the LOS signal components and the multipath signal components may have different phases, an amplitude of the synthesis signal may be lesser (destructive interference) than that of each component. That is, signals received by the satellite signal receiver have a synthesized signal component of the two signal components, and a correlation response thereof exhibits a distorted version of an ideal correlation response of the LOS signal transmitted through a direct path.

Figure 10:
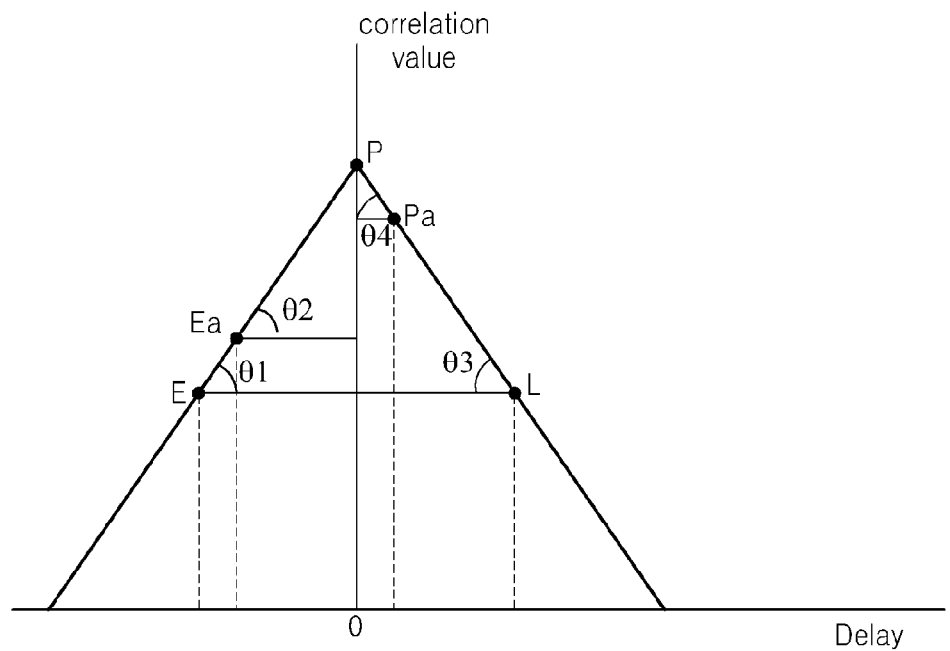
FIG. 10 is a graph illustrating a correlation response characteristic for a received signal lacking multi-path signal components.

FIG. 10 is a graph showing a correlation response characteristic for a received satellite signal lacking multipath signal components. The horizontal axis on the graph denotes a time delay, and the vertical axis denotes a correlation value. E, P, and L points illustrated on the graph respectively may be expressed any one position on the graph according to a time delay and a correlation value. The E point and the L point are set to be symmetric with respect to the P point in terms of a time delay. When the multipath signal components do not exist, and the E and L correlation values have the same values, the P correlation value has a peak value on the correlation response graph, and accordingly the satellite signal receiver is made to accurately track a phase of a code.

According to an embodiment of the inventive concept, at least two additional replica codes (e.g., the Ea code and Pa code described above) are generated, and corresponding correlation values (Ea correlation value and Pa correlation value) for the additional replica codes are calculated. The Ea code and Pa code have different respective time delays relative to the E and P codes. For example, the Ea code may have a greater time delay than the E code, and a lesser time delay than the P code. The Pa code may have a greater time delay than the P code, and a lesser time delay than the L code.

Using the calculated correlation values, multipath effects may be detected and a compensation value may be calculated using the detected effects. When multipath signal components are not present, a first gradient $\theta1$ for a first slope formed between the E point and Ea point has almost the same value as a second gradient $\theta2$ for a second slope formed between the Ea point and the P point. Also, a third gradient $\theta3$ for a third slope formed between the L point and the Pa point has the almost same value as a fourth gradient $\theta4$ for a fourth slope formed between the Pa point and the P point. The respective signs of the first gradient $\theta1$ and the second gradient $\theta2$ may be the same, and the signs of the third gradient $\theta3$ and the fourth gradient $\theta4$ may be the same. (Hereafter, for the sake of brevity, respective gradients will be said to be "formed between" points bearing in mind an understanding that each gradient is in fact derived from slope that exists between said points).

Thus, using the calculated correlation values a plurality of slopes may be derived on the correlation response graph, and respective gradients for the slopes may be discriminated. The various gradients may have different values (or magnitudes) and signs according to differences between the correlation values. For example, since each time delay for the two correlation values is preset, once a difference between the two correlation values is obtained, a slope gradient formed of corresponding two correlation points may be discriminated between. Multipath signal components may thus be detected by comparing respective slope gradients (i.e., signs and/or values). In the example shown in FIG. 10, when first and second gradients $\theta1$ and $\theta2$ have the same value and sign, and third and fourth gradients $\theta3$ and $\theta4$ have the same value and sign, it may be readily determined that multipath signal components are not present.

Figure 11:
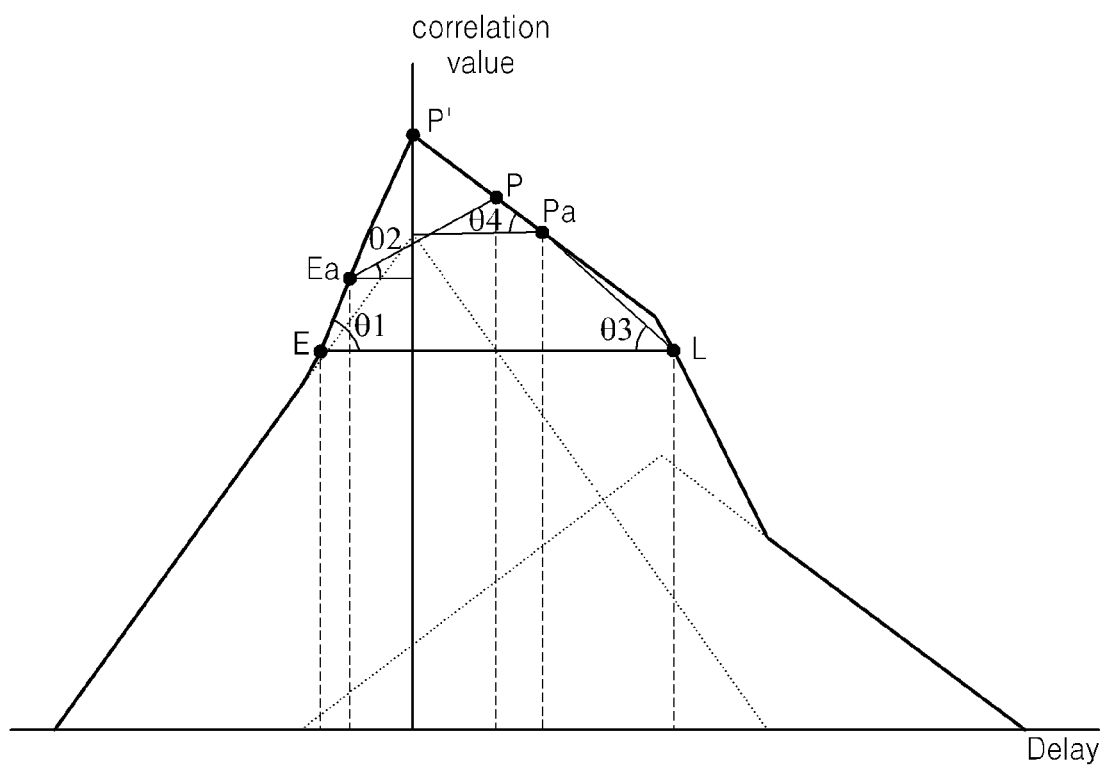
FIG. 11 is a graph illustrating an exemplary correlation response for a received signal having multi-path signal components.

In contrast to the conditions illustrated in correlation response graph of FIG. 10, FIG. 11 is a graph illustrating another correlation response when multipath signal components are present. In FIG. 11, correlation responses for an LOS signal, multipath signal components and a synthesis signal that the LOS signal and the multipath signal components are synthesized. FIG. 11 also illustrates an example in which a peak value of the correlation response of the synthesis signal is greater (constructive interference) than each peak of correlation values of signal components.

As illustrated in FIG. 11, when multipath signal components are present, a satellite signal receiver receives a synthesis signal distorted by the multipath signal components and performs a tracking operation. In this case, even though a difference between the E correlation value and the L correlation value is maintained at 0, the satellite signal receiver may not perform an accurate tracking operation, and a form of a correlation response conventionally formed on a limited basis using E-P-L becomes distorted due to effects of a distorted synthesis signal.

As described above, when a correlation response gets distorted, the various slope gradients (e.g., first through fourth slope gradients) are changed. For example, the sign of the first gradient $\theta1$ formed between the E point and Ea point and the sign of the second gradient $\theta2$ formed between the Ea point and the P point are the same. Also, the sign of the third gradient $\theta3$ formed between the L point and Pa point and the sign of the fourth gradient $\theta4$ formed between the Pa point and P point are the same. In addition, a comparison operation for the gradient values may be performed, for example, a comparison operation for an absolute value of a difference between two gradients may be performed. The example of FIG. 11 shows that an absolute value of a difference between the first and second gradients $\theta1$ and $\theta2$ is greater than an absolute value of a difference between the third and fourth gradients $\theta3$ and $\theta4$.

That is, by analysing the various gradients $\theta1$ through $\theta4$, the effects of the multipath signal components may be detected. Also, in calculating a compensation value, the compensation value may be calculated through different calculation schemes according to the analysis result of the gradients. Since at least two or more comparison operations are performed using a number of slope gradients, any one combination of the comparison results may be created among combinations of the plurality of comparison results. The compensation value may be calculated through different calculation schemes according to the created comparison result combination.

When the comparison results of gradient sign comparison and gradient value comparison are performed as shown in the example of FIG. 11, a time delay may be detected by calculating a cross point for at least two slopes among the first through fourth slopes. For example, a time delay corresponding to a cross point may be detected by acquiring the cross point of the first slope formed of the E and Ea points and the fourth slope formed of the Pa and P points. By using the detected time delay as a compensation value, a time delay error of the P point shifted by the multipath signal components may be compensated for. That is, the time delay corresponding to P' point illustrated on the correlation response graph may be determined to be an optimal synchronization time point.

Figure 12:
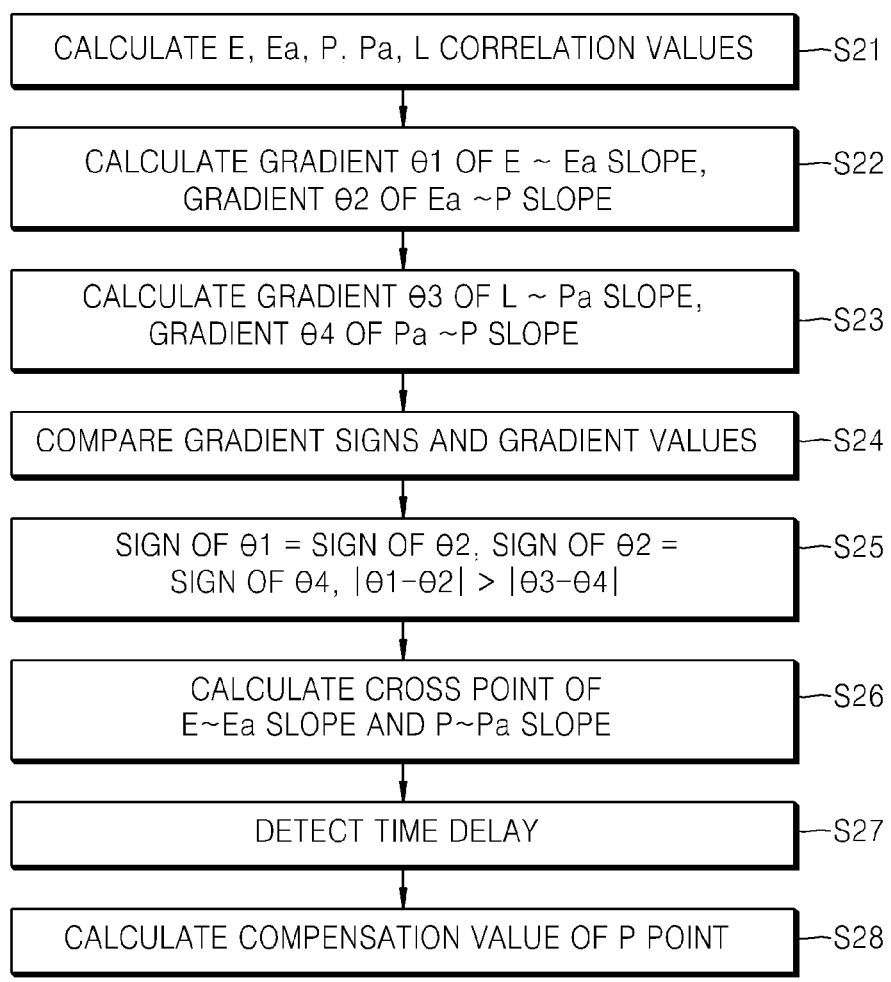
FIG. 12 is a flowchart summarizing a time delay detection and compensation method that may be used in obtain the correlation response characteristic of FIG. 11.

FIG. 12 is a flowchart summarizing a time delay detection and compensation operation for the correlation response characteristic of FIG. 11.

As illustrated in FIG. 12, by using a plurality of replica codes, a plurality of correlation values are calculated, for example, E, Ea, P, Pa, and L correlation values are calculated (S21). By using the calculated correlation values, two or more slopes may be obtained and a gradient of each slope may be calculated. As an example, the first gradient $\theta1$ formed between the E point and Ea point and the second gradient $\theta2$ formed between the Ea point and the P point may be calculated (S22). Also, the fourth gradient $\theta4$ formed between the Pa point and P point and the third gradient θ3 formed between the L point and Pa point may be calculated (S23).

Once the various slope gradients are calculated, a comparison operation for the gradients may be performed. That is, the signs and/or values of the gradients are compared (S24). For example, respective comparison(s) may be had between the signs of the first and second gradients θ1 and θ2; between the signs of the third and fourth gradients θ3 and θ4; between the values of the first and second gradients θ1 and θ2; and between the values of the third and fourth gradients θ3 and θ4.

By these comparison operation(s), any one comparison result may be generated among a plurality of comparison results, and a time delay and a compensation value calculation operations corresponding to the generated comparison results may be performed. As shown in FIG. 11, when the signs of the first and second gradients θ1 and θ2 are the same, the signs of the third and fourth gradients θ3 and θ4 are the same, and the absolute value of the difference between the values of the first and second gradients θ1 and θ2 is greater than the absolute value of the difference between the values of the third and fourth gradients θ3 and θ4 (S25), a cross point for any two slopes may be calculated. For example, a first cross point for the first slope formed of the E point and the Ea point and the fourth slope formed of the Pa point and the P point may be calculated (S26). A time delay corresponding to the calculated cross point may de detected (operation S27), and a compensation value corresponding to the detected time delay may be calculated to compensate for a time delay error of the P point due to multipath signal components (S28).

Figure 13:
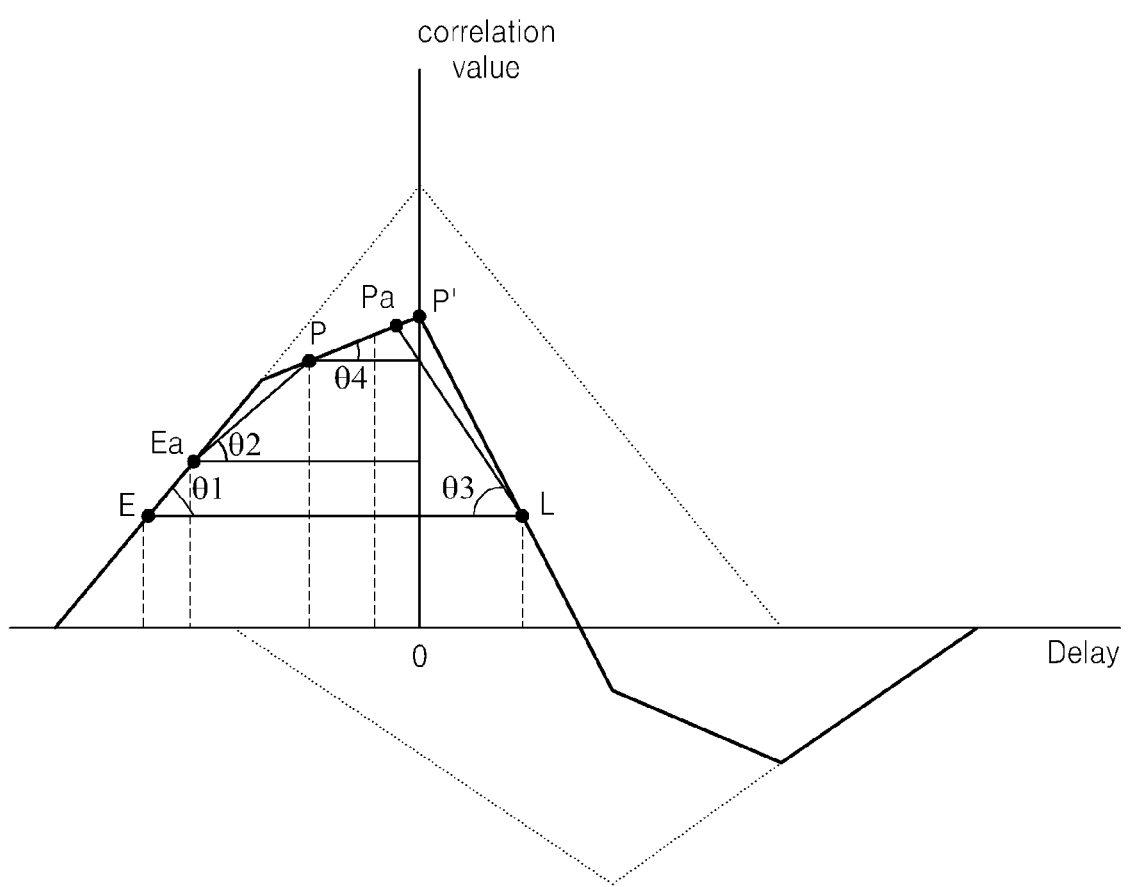
FIG. 13 is a graph illustrating another exemplary correlation response for a received signal having multi-path signal components.
Figure 14:
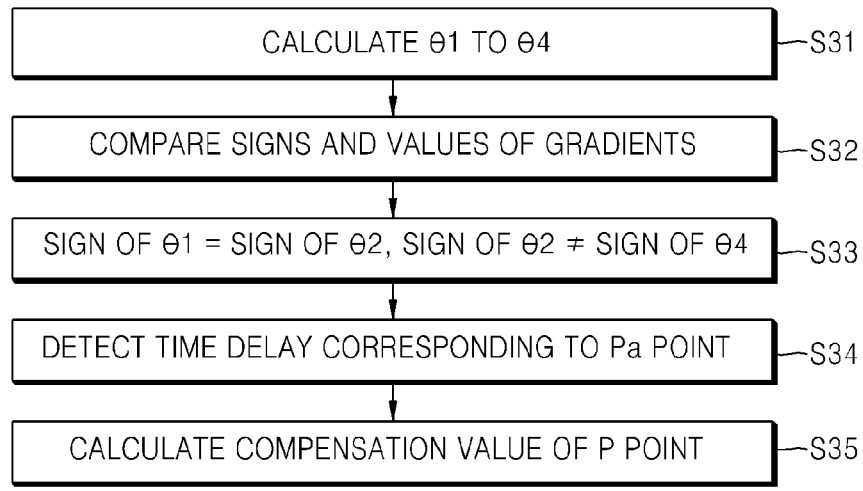
FIG. 14 is a flowchart summarizing a time delay detection and compensation method that may be used in obtain the correlation response characteristic of FIG. 13.

FIG. 13 is a graph illustrating another example of a correlation value when multipath signal components are present. FIG. 14 is a flowchart summarizing a time delay compensation operation for the correlation response of FIG. 13.

FIG. 13 shows an example where a peak value of a correlation response of a synthesis signal is lesser (destructive interference) than a peak value of a correlation response of a LOS signal component. Also, FIG. 13 illustrates a correlation response of a synthesis signal when the LOS signal component and the multipath signal components have a lesser time delay than a single chip. The time delay detection and compensation operations according to the present embodiment will be described with FIGS. 13 and 14.

Again, a plurality of slopes is obtained from a plurality of points on a correlation response graph, and respective slope gradients are calculated (S31). When the gradient of the plurality of slopes are calculated, an operation of gradient comparison is performed. For example, signs and values of the gradients may be compared with each other (S32). When the correlation response graph for the received signal is expressed as shown in FIG. 13 due to the multipath signal components, the fourth gradient θ4 formed between the Pa point and P point and the third gradient θ3 formed between the L point and Pa point have different signs, and the first gradient θ1 formed between the E point and Ea point and the second gradient θ2 formed between the Ea point and the P point have the same sign (S33).

A compensation value may be calculated by using the analyzed result of the gradients. For example, when the gradient comparison results as shown in FIG. 13 are generated, a time delay corresponding to the Pa point is detected (S34), and by using the detected time delay, a compensation value is calculated to compensate for the P point time delay (S35). That is, when the above described comparison results are generated, the Pa point may be positioned between the P point and an actual optimal synchronization time point (P' point), and accordingly, a relative optimal synchronization time point may be determined by adjusting a delay of the P point by using a time delay corresponding to the Pa point. As an example, a time delay corresponding to the Pa point may be determined to be the synchronization time point.

FIG. 14 illustrates how signs and values of the gradients are compared, but comparison of only signs of the gradients in the example in FIG. 14 may also be performed. For example, when the first gradient θ1 and the second gradient θ2 have the same sign, and the third gradient θ3 and the fourth gradient θ4 have different signs, it will be understood that the same correlation graph shown in FIG. 13 will be derived, and then the compensation value may be calculated without the comparison operation of the gradient values (or absolute values of the gradient differences).

Figure 15:
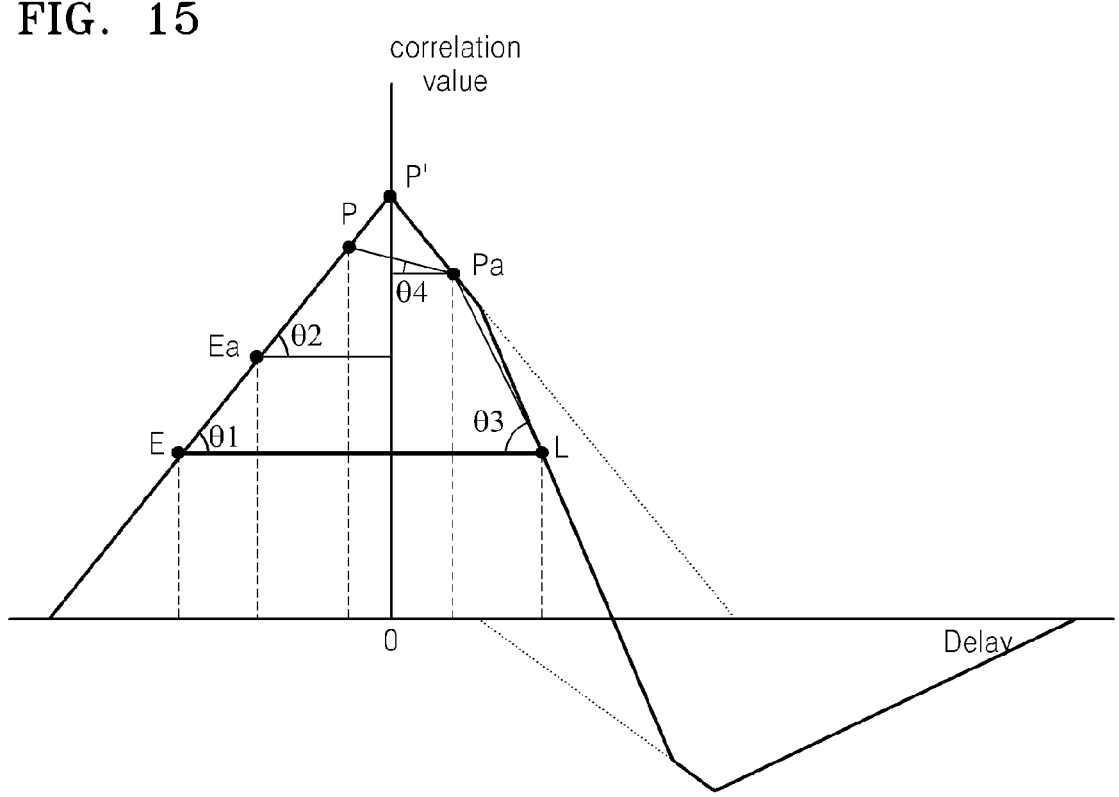
FIG. 15 is a graph illustrating still another exemplary correlation response for a received signal having multi-path signal components.
Figure 16:
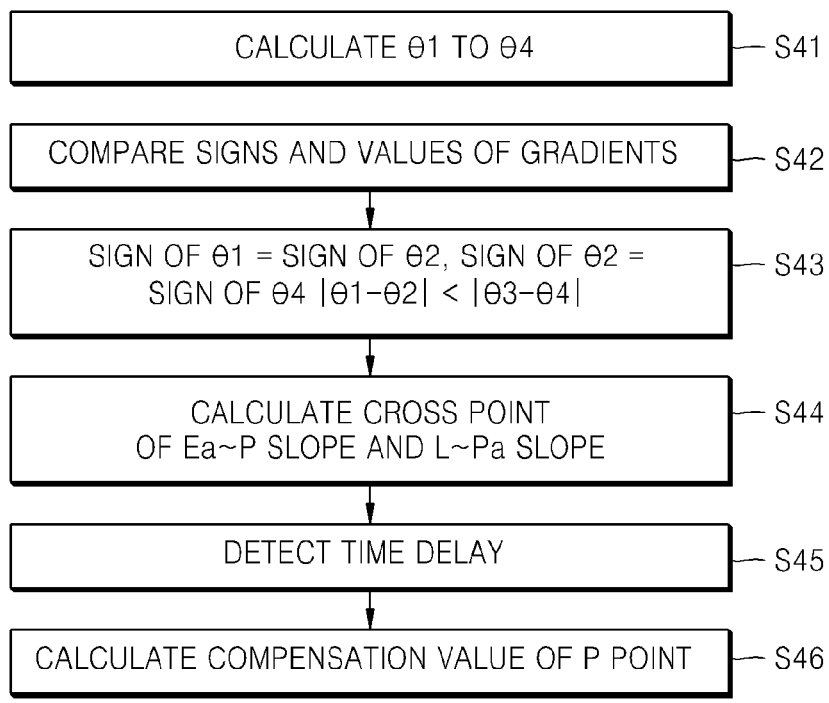
FIG. 16 is a flowchart summarizing a time delay detection and compensation method that may be used in obtain the correlation response characteristic of FIG. 15.

FIG. 15 is a graph illustrating still another correlation response for a received signal including multipath signal components. FIG. 16 is a flowchart summarizing a time delay compensation operation for the correlation response in FIG. 15. FIG. 15 shows a correlation response of a synthesis signal in a case where a peak value of a correlation of a synthesis signal is the same as a peak value of a correlation response of the LOS signal component, a gradient of a downward slope is sharp (destructive interference), and the LOS signal component and the multipath signal components have a time delay greater than a single chip. The time delay detection and compensation operations according to the present embodiment will be described in relation to FIGS. 13 and 14.

A plurality of slopes are obtained from a plurality of points on a correlation response graph, and each gradient of the slopes are calculated (S41). Also, when the gradients of the plurality of slope are calculated, a gradient comparison operation is performed. For example, signs and values of the gradients are compared (S42).

In the example of FIG. 15, the fourth gradient θ4 formed between the Pa point and P point, and the third gradient θ3 formed between the L point and Pa point have the same sign. Also the first gradient θ1 formed between the E point and Ea point, and the second gradient θ2 formed between the Ea point and P point have the same sign. In addition, an absolute of a difference of the third gradient θ3 and the fourth gradient θ4 is greater than an absolute of a difference of the first gradient θ1 and the second gradient θ2 (S43).

By using the analysis results of the gradients, the compensation value may be calculated. For example, when the same gradient sign and gradient value comparison results as shown in FIG. 15 are generated, a time delay may be detected by calculating a cross point of at least two slopes among the first to fourth slopes. For example, a cross point of the second slope formed of the Ea point and the P point, and the third slope formed of the L point and the Pa point is calculated (S44), a time delay corresponding to the cross point is detected (S45), and a compensation value for compensating for a P point delay is calculated by using the detected time delay (S46). Using the detected time delay as the compensation value, a time delay error of a shifted P point due to the multipath signal components may be compensated for. That is, the time delay corresponding to a P' point shown on the correlation response graph is determined to be an optimal synchronization time point.

As the above described embodiments, a scheme wherein signs and values of gradients of a plurality of slope are compared with each other, and a timed delay detection and a compensation value are calculated according to each comparison result is described, but embodiments of the present concept are not limited thereto. For example, in the embodiments, an example is described wherein signs and values of gradients of the first and second slopes are compared, signs and values of gradients of the third and fourth slopes are compared, and absolute values of differences of values of the gradients are compared. However, slopes of gradient comparison targets may be varied. When more replica codes are generated, a time delay may be calculated by using only signs of gradients of slopes or only values of gradient of slopes.

Figure 17:
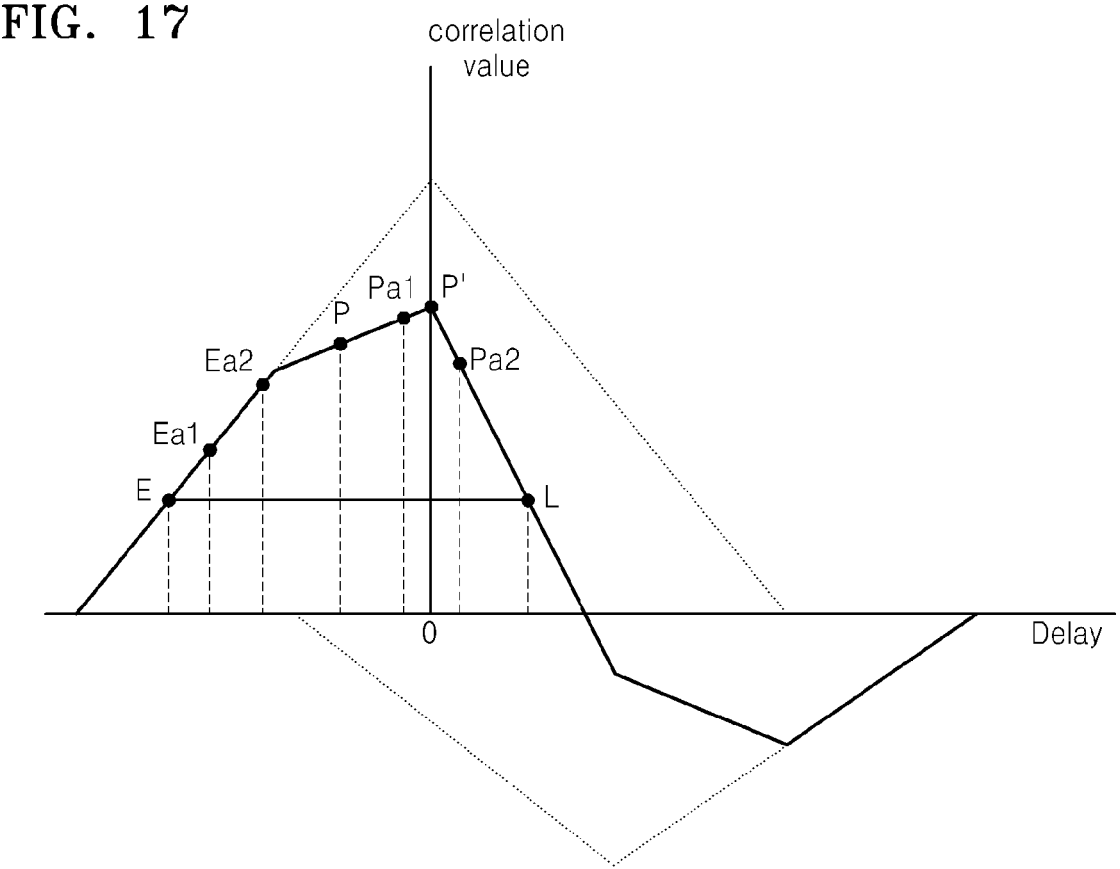
FIG. 17 is a graph illustrating an exemplary code tracking operation according to an embodiment of the inventive concept.

FIG. 17 is a graph illustrating a sign tracking operation according to another embodiment of the inventive concept. FIG. 17 shows an example in which a plurality of replica codes besides E, P, and L codes are generated, and a plurality of slopes are obtained to calculate gradients thereof. Also, for convenience of description, in FIG. 17, a peak value of a correlation response for a synthesis signal is greater than a peak value of a correlation value of an LOS signal, and an LOS signal component and multipath signal components have time delays lesser than a single chip.

As illustrated in FIG. 17, at least three or more replica codes beside the E, P, and L codes are further generated. For example, Ea1 and Ea2 codes having time delays greater than that of the E code and lesser than that of the P code may be further generated. Also, Pa1 and Pa2 codes having time delays greater than that of the P code and lesser than that of the L code may be further generated.

A plurality of slopes may be obtained on a correlation response graph by using the replica codes. As described above, the first slope formed of the E and Ea points, the second slope formed of the Ea1 and P points, the third slope formed o the L and Pa1 points, and the fourth slope formed of the Pa1 and Pa2 points may be obtained. In addition, additional slopes may be obtained by using the Ea2 and Pa2 points. For example, slopes may be obtained by using the E and Ea2 points or Ea1 and Ea2 points. Similarly, a slope formed of the Pa1 and Pa2 points or a slope formed of the L and Pa2 points may be obtained.

That is, according to an embodiment of the present concept, three or more replica codes besides the E, P and L codes may be further generated, and, corresponding to these, three or more correlators may be further included. More slopes may be obtained on the correlation response graph by using correlation values output from the additional correlators. A time delay is predicted by using signs and/or values of slope gradients, and an optimal compensation for a time delay error may be performed by calculating the compensation value according to the predicted time delay. For example, even though a plurality of multipath signal components are included in a received signal resulting in variations in the correlation response graph, a time delay due to the multipath signal components may be detected according to analysis results of the slope gradients, and a optimal compensation value may be calculated.

Figure 18:
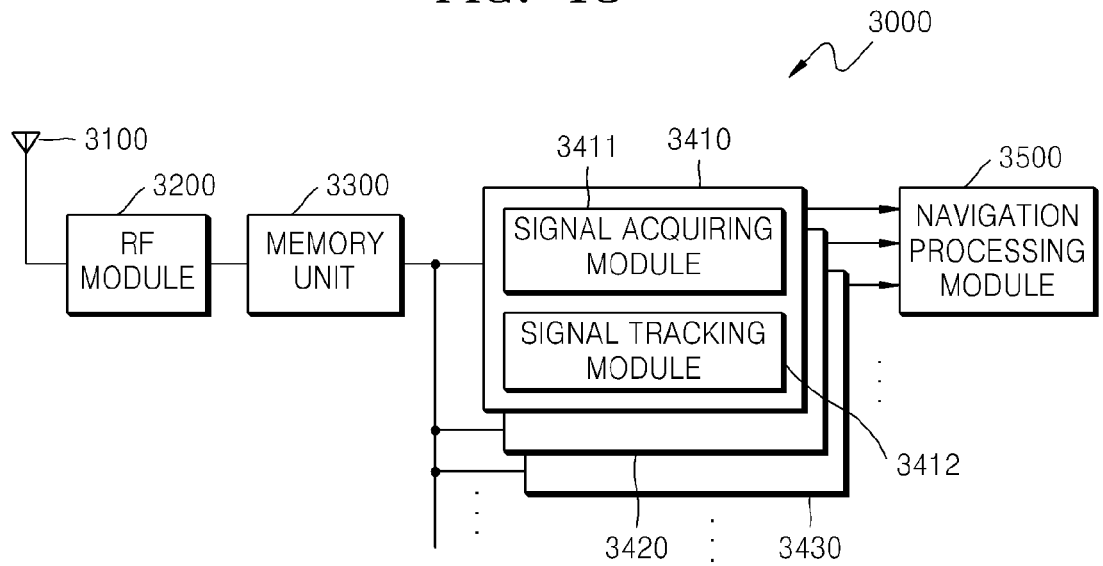
FIG. 18 is a block diagram illustrating a satellite signal receiver according to certain embodiments of the inventive concept.

FIG. 18 is a block diagram illustrating an exemplary satellite signal receiver according to another embodiment of the present concept. As illustrated in FIG. 18, the satellite signal receiver 3000 may include an antenna 3100, an RF module 3200, a memory unit 3300, a plurality of reception channels 3410, 3420, and 3430, and a navigation processing module. Also, the receiving channels may each include a signal acquiring module 3411 and a signal tracking module 3412. Even though the reception channels 3410, 3420, and 3430, and the navigation processing module 3500 are illustrated as separate functional blocks, the reception channels 3410, 3420, and 3430, and the navigation processing module 3500 may be integrated in an identical processor (not shown). Alternatively, the memory unit 3300 may also be included.

A signal from a GNSS satellite is received by the antenna 3100 and provided to the RF module 3200, the RF module 3200 performs amplification and noise filtering on the input signal. Also the RF module 3200 converts the received filtered signal into an intermediate signal, and the converted intermediate analog signal into a digital signal. The converted digital signal is provided to the memory unit 3300, and the memory unit 3300 may be implemented as a first-in, first-out (FIFO) memory. The memory 3300 provides the received signal to the plurality of reception channels 3410, 3420 and 3430 according to a stored order.

The reception channels 3410, 3420, and 3430 may be included in the satellite signal receiver 3000 to correspond to the plurality of satellites providing the satellite signal, and the signal acquiring/tracking modules 3411 and 3412 therein obtain and track a signal from the corresponding satellite. For this, each of the reception channels 3410, 3420, and 3430 generates unique codes (e.g., a PRN code) corresponding to a satellite of a target object, and performs a signal acquiring/tracking process on the basis of a correlation processing operation. Each signal tracking module 3412 may perform a signal tracking operation by using an EL-DLL scheme on the basis of the E, P, and L codes, and further generate at least two replica codes besides the E, P, and L codes. In addition, according to further generation of the at least two replica codes, at least two correlators may be further included to calculate correlation values for the at least two replica codes.

In addition, by using the correlation values from the correlators, effects due to multipath signal components are detected and a compensation value is calculated. The signal tracking operation by the above described embodiments may be applied to the signal tracking module 3412. Accordingly a plurality of slopes may be obtained from a plurality of correlation points on a correlation response graph having a time delay and a correlation value as two axes thereof. Then, operations of time delay detection and compensation value calculation may be performed according to a comparison result of gradients of the slopes. For the received signal, the effects due to the multipath signal components are compensated for, and then the navigation processing module 3500 performs a navigation process of acquiring position information and time information of the satellite signal receiver 3000.

Figure 19:
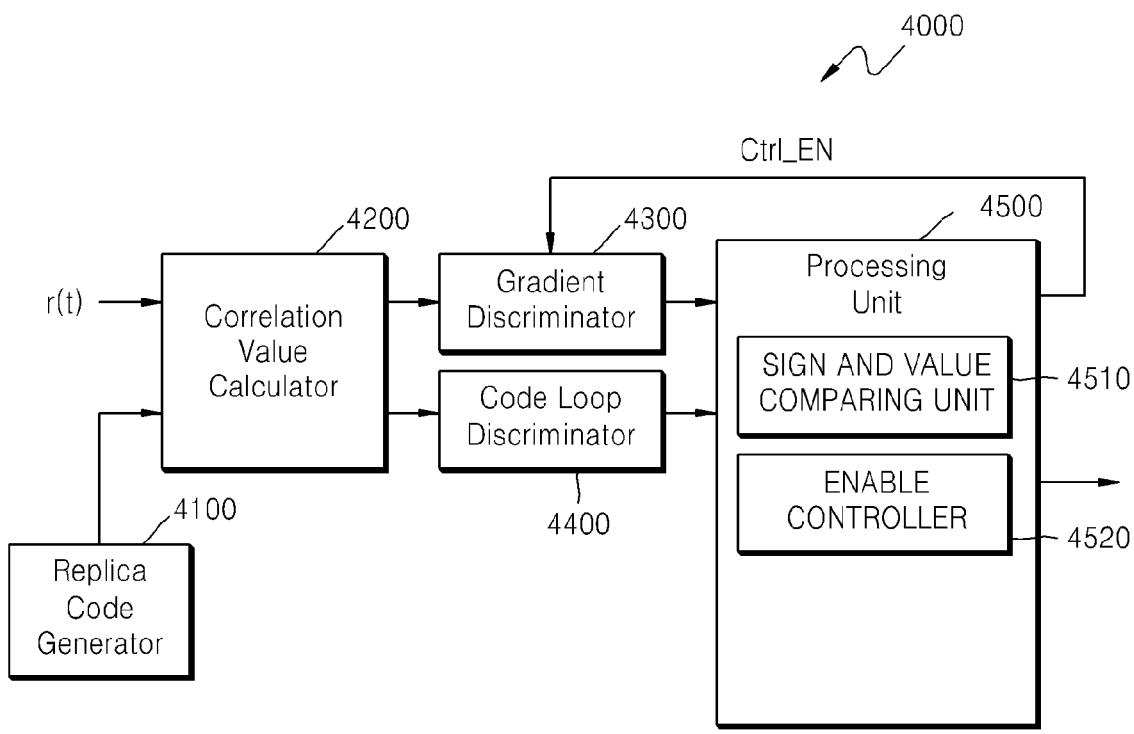
FIG. 19 is a block diagram illustrating an implementation example for a satellite signal receiver according to certain embodiments of the inventive concept.

FIG. 19 is a block diagram illustrating in one example a satellite signal receiver 4000 according to another embodiment of the inventive concept. In FIG. 19, a configuration of the signal tracking module included in the satellite signal receiver 4000 is illustrated.

The satellite signal receiver 4000 may include a replica code generator 4100, a correlation value calculator 4200, a gradient discriminator 4300, a code loop discriminator 4400, and a processing unit 4500. The processing unit 4500 may include a gradient sign/value comparing unit 4510 for comparing signs and values of gradients by using discriminated gradients of a plurality of slopes obtained on a correlation response graph according to the above described embodiments, and an enable controller 4520 for determining a channel state according to the sign/value of the gradients to control whether the gradient discrimination operation is enabled. Even though it is not illustrated in FIG. 19, other functions to perform the signal tracking operation as described above may be further performed in the processing unit 4500.

The replica code generator 4100 provides at least two generated replica codes besides the E, P, and L codes to the correlation value calculator 4200. The correlation calculator 4200 includes a plurality of correlators respectively receiving the replica codes, and the correlators respectively output calculated correlation values between the replica codes corresponding to the receive signal r(t). At least a portion of the calculated correlation values are provided to the gradient discriminator 4300 and the code loop discriminator 4400. As an example, the code loop discriminator 4400 discriminates a difference between an E correlation value and an L correlation value and outputs the discrimination result.

The gradient discriminator 4300 obtains a plurality of slopes by using the calculated correlation values, and also outputs a result of discriminating each gradient of the slopes. The discriminated results of the gradient discriminator 4300 and the code loop discriminator 4400 may be provided to the processing unit 4500. Then, through a subsequent signal processing operation, an operation of adjusting phases of the replica codes is performed until the E correlation value and the L correlation value become the same, and operations of detecting effects due to multipath signal components on the basis of a comparison operation of signs/values of gradients are performed, and the detected effects are compensated for.

Meanwhile, operations of discriminating each slope gradient, comparing the gradients and calculating a compensation value may be necessary in an environment in which the multipath signal components do not exist. For this, the comparison results from the gradient sign/value comparing unit 4510 may be provided to the enable controller 4520. In an environment in which the multipath signal components do not exist, the same gradient comparison results as shown on the correlation response graph in FIG. 10 may be calculated.

The enable controller 4520 may output a control signal Ctrl_En to disable operation of the gradient discriminator 4300 when the same comparison results as shown on the correlation response graph in FIG. 10 are maintained for a predetermined period of time. Accordingly, due to disabling the gradient calculation and comparison operation, the processor resource may be efficiently utilized. As an example, when the gradient discriminator 4300 is disabled by the enable controller 4520 and is not used in order to efficiently use the processor resource, the replica code generator 4100 provides generated replica codes generated by setting the Ea code and the Pa code symmetrically with respect to the P code to the correlation calculator 4200. The added correlators of the correlation calculator 4200 according to the present concept may replace an Ea correlation value with an E correlation value, and a Pa correlation value corresponding to the Pa code with an L correlation value and provide the correlation values to the code loop discriminator 4400. By discriminating between the Ea correlation value provided as the E correlation value, and the Pa correlation value provided as the L correlation value to the code loop discriminator 4400 and outputting the discriminated result, code spacing can be consequently reduced, and a measurement error that may occur in signal tracking may be further reduced compared to when measuring by using the existing E correlation value and the L correlation value. A condition for enabling the operation of the gradient discriminator 4300 again may be variously set. For example, when the satellite signal receiver moves a predetermined distance or more from a current position to change a reception environment, the operation of the gradient discriminator 4300 may be enabled again. Alternatively, when respective amplitudes of the correlation values are compared, the P correlation value is lesser by a predetermined value than other correlation values (e.g., the Pa correlation value or the Ea correlation value), and it is accordingly highly possible for the multipath signal components to be present with the received satellite signal, the operation of the gradient discriminator 4300 may be enabled again.

While the inventive concept has been particularly shown and described with reference to exemplary embodiments thereof, it will be understood that various changes in form and details may be made therein without departing from the scope of the following claims.

What is claimed is:

1. A processor-implemented method of tracking a signal in a satellite navigation system, the method comprising:
   generating replica codes comprising at least an E code, a P code, a L code, a first code and a second code;
   calculating a plurality of correlation values between a satellite signal code derived from a received satellite signal and each one of the replica codes;
   discriminating between slope gradients respectively derived from at least two lines extending between any two of an E point, a P point, a L point, a first point, and a second point that respectively correspond to the E code, P code, L code, first code and second code, as expressed on a planar correlation response graph in which one axis denotes time delay associated with each replica code and another axis denotes correlation value calculated from each replica code; and
   detecting a time delay due to multipath signal components of the received satellite signal according to a result of the discriminating between slope gradients.

2. The method of claim 1, further comprising:
   calculating a compensation value for compensating for a delay error of a current synchronization time point according to the time delay.

3. The method of claim 1, wherein the discriminating between the slope gradients comprises discriminating between a first slope gradient and a second slope gradient, wherein the discriminating between the first slope gradient and the second slope gradient comprises at least one of discriminating between signs of the first slope gradient and the second slope gradient and discriminating between values of the first slope gradient and the second slope gradient.

4. The method of claim 3, where the detecting of the time delay comprises detecting the time delay in accordance with discriminating between the signs of the first slope gradient and the second slope gradient and discriminating between the values of the first slope gradient and the second slope gradient.

5. The method of claim 1, wherein the discriminating of the slope gradients comprises:
   deriving a first slope connecting the E point and the first point;
   deriving a second slope connecting the first point and the P point;
   deriving a third slope connecting the L point and the second point; and
   deriving a fourth slope connecting the second point and the P point.

6. The method of claim 5, further comprising:
   comparing a sign of a first gradient derived from the first slope with a sign of a second gradient derived from the second slope; and
   comparing a sign of a third gradient derived from the third slope with a sign of a fourth gradient derived from the fourth slope.

7. The method of claim 5, further comprising:
comparing a value of a first gradient derived from the first slope with a value of a second gradient derived from the second slope; and
comparing a value of a third gradient derived from the third slope with a value of a fourth gradient derived from the fourth slope.

8. The method of claim 5, further comprising:
comparing a sign of a first gradient derived from the first slope with a sign of a second gradient derived from the second slope;
comparing a sign of a third gradient derived from the third slope with a sign of a fourth gradient derived from the fourth slope;
comparing a value of the first gradient with a value of the second gradient; and
comparing a value of the third gradient with a value of the fourth gradient.

9. The method of claim 8, wherein the detecting of the time delay comprises:
detecting the time delay in accordance with results of comparing the sign of the first gradient with the sign of the second gradient, comparing the sign of the third gradient with the sign of the fourth gradient, comparing the value of the first gradient with the value of the second gradient, and comparing the value of the third gradient with the value of the fourth gradient.

10. The method of claim 9, wherein comparing the value of the first gradient with the value of the second gradient comprises comparing an absolute value of a difference between values between the first slope and the second slope, and
comparing the value of the third gradient with the value of the fourth gradient comprises comparing an absolute value of a difference between values between the third slope and the fourth slope.

11. The method of claim 1, wherein the detecting of the time delay comprises:
generating a comparison result combination from among a plurality of comparison result combinations derived by comparing multiple slope gradients; and
applying different time delay detecting schemes according to the comparison result combination.

12. The method of claim 1, wherein the first code has a greater time delay than the E code and a lesser time delay than the P code, and
the second code has a greater time delay than the P code and a lesser time delay than the L code.

13. The method of claim 1, wherein the generating of the replica codes comprises:
generating additional third through $N^{th}$ codes, where "N" is an integer greater than two, each one of the third through $N^{th}$ codes being different from the E code, P code, L code, first code and second code and having a different respective time delay.

14. The method of claim 13, wherein the discriminating of the gradients comprises:
discriminating between slope gradients respectively derived from at least two lines extending between any two of the E point, P point, L point, and the first through the $N^{th}$ points, wherein the third through $N^{th}$ points respectively correspond to the third through $N^{th}$ codes.

15. An apparatus for tracking a satellite signal in a satellite navigation system, the apparatus comprising:
a replica code generator that generates replica codes including an E code, a P code, a L code, a first code and a second code;
a correlation value calculating unit that calculates a plurality of correlation values between the satellite signal and the replica codes;
a gradient discriminator that discriminates between slope gradients for at least two lines connecting any two correlation points respectively corresponding to the replica codes and provides a discrimination result, the at least two lines as expressed on a planar correlation response graph in which one axis denotes time delay associated with each replica code and another axis denotes correlation value calculated from each replica code; and
a processing unit that detects a time delay due to multipath signal components of the satellite signal according to the discrimination result and provides a compensation value based on the detected time delay.

16. The apparatus of claim 15, wherein the first code has a greater time delay than the E code and a lesser time delay than the P code, and
the second code has a greater time delay than the P code and a smaller time delay than the L code.

17. The apparatus of claim 15, wherein the replica code generator further generates third through $N^{th}$ codes, where "N" is an integer greater than 2, each one of the third through $N^{th}$ code having a different time delay from the E code, P code, L code, first code and second code.

18. The apparatus of claim 15, wherein the correlation value calculation unit includes first to fifth correlators that respectively calculate correlation values between each of the E code, the P code, the L code, the first code and the second code, and the satellite signal.

19. The apparatus of claim 15, wherein the gradient discriminator discriminates between at least one of signs and values for the at least two slope gradients.

20. The apparatus of claim 15, wherein the processing unit detects the time delay by comparing at least one of signs and values for the at least two slope gradients.

21. The apparatus of claim 20, wherein any one comparison result combination is generated by comparing the signs and values of the at least two slope gradients.

22. The apparatus of claim 21, wherein different time delay detecting schemes are applied according to the comparison result combination.

23. A satellite signal receiver comprising:
a radio frequency (RF) module that performs frequency conversion on a received satellite signal to generate a frequency converted signal; and
a signal processing unit comprising:
a signal acquiring module that performs a signal acquiring operation on the frequency converted signal to generate an acquired signal; and
a signal tracking module that performs a signal tracking operation on the acquired signal,
wherein the signal tracking module generates replica codes including an E code, a P code, an L code, a first code and a second code to calculate a plurality of correlation values for the satellite signal, detects a time delay due to multipath signal components based on analyzing at least some of the plurality of correlation values, and compensates for a delay error of the satellite signal by calculating a compensation value according to a result of the detecting the time delay.

24. The satellite signal receiver of claim 23, wherein the signal tracking module detects the time delay by comparing signs and values for the gradient slopes.

25. The apparatus of claim 23, wherein the signal tracking module calculates a compensation value corresponding to the detected time delay to compensate for a time delay error of the satellite signal.

26. The apparatus of claim 23, wherein the signal tracking module comprises:
- a replica code generator that generates the replica codes;
- a correlation value calculating unit that calculates the plurality of correlation values using the replica codes;
- a gradient discriminator that discriminates between slope gradients derived from lines connecting any two correlation points respectively corresponding to the replica codes; and
- a processing unit that detects the time delay by comparing discriminated slope gradients and calculating a compensation value corresponding to the detected time delays.

27. The apparatus of claim 26, wherein the first code has a greater time delay than the E code and a lesser time delay than the P code, and the second code has a greater time delay than the P code and a lesser time delay than the L code.

28. The apparatus of claim 26, wherein the correlation value calculating unit comprises first through fifth correlators respectively calculating correlation values for the E code, P code, L code, first code and second code.

* * * * *